(12) United States Patent
Johnson et al.

(10) Patent No.: US 9,321,172 B2
(45) Date of Patent: Apr. 26, 2016

(54) MODULAR ROTATIONAL ELECTRIC ACTUATOR

(75) Inventors: Ezra Johnson, Fredericksburg, VA (US); Thomas W. Van Doren, Fredericksburg, VA (US); W. Travis Lontz, Fredericksburg, VA (US); Billy Mitchell Coleman, Woodford, VA (US)

(73) Assignee: HDT Expeditionary Systems, Inc., Solon, OH (US)

( * ) Notice: Subject to any disclaimer, the term of this patent is extended or adjusted under 35 U.S.C. 154(b) by 712 days.

(21) Appl. No.: 13/469,807

(22) Filed: May 11, 2012

(65) Prior Publication Data

US 2012/0286629 A1 Nov. 15, 2012

Related U.S. Application Data

(60) Provisional application No. 61/485,848, filed on May 13, 2011.

(51) Int. Cl.
*H02K 7/116* (2006.01)
*H02K 11/00* (2006.01)
(Continued)

(52) U.S. Cl.
CPC .. *B25J 9/102* (2013.01); *B25J 9/08* (2013.01); *H02K 7/003* (2013.01); *H02K 7/116* (2013.01); *H02K 7/14* (2013.01); *H02K 29/08* (2013.01); *F16H 1/32* (2013.01); *F16H 1/46* (2013.01); *H02K 5/225* (2013.01); *H02K 11/0042* (2013.01); *H02K 11/0047* (2013.01); *H02K 21/16* (2013.01); *H02K 2213/12* (2013.01)

(58) Field of Classification Search
CPC ....... H02K 2213/12; H02K 5/24; H02K 7/10; H02K 7/116; B25J 9/08; B25J 9/102
USPC .......... 901/23–26; 74/490.01–490.06; 623/24
See application file for complete search history.

(56) References Cited

U.S. PATENT DOCUMENTS

| | | | |
|---|---|---|---|
| 4,512,709 A | 4/1985 | Hennekes et al. | |
| 4,521,924 A | 6/1985 | Jacobsen et al. | |

(Continued)

FOREIGN PATENT DOCUMENTS

| | | |
|---|---|---|
| DE | 103 26 239 | 1/2005 |
| EP | 0 081 299 A2 | 6/1983 |

(Continued)

OTHER PUBLICATIONS

Said et al., "Flexible Modular Robotics Link Design", Tencon 200 Proceedings, IEEE Region 10 Annual Conference, Kuala Lumpur, Malaysia, pp. 162-166 (2000).

(Continued)

*Primary Examiner* — Quyen Leung
*Assistant Examiner* — Eric Johnson
(74) *Attorney, Agent, or Firm* — Fay Sharpe LLP

(57) ABSTRACT

A modular rotational electric actuator includes an output housing and internal drive components that include integrated control electronics, a torque sensor, and a portion of a joint assembly. The joint assembly includes a joint connector coupled to the internal drive components, including integrated control electronics, e.g., by a resilient member. The resilient member elastically couples the joint connector to a portion of the output housing, the joint connector including a portion that extends outward therefrom.

23 Claims, 21 Drawing Sheets

(51) Int. Cl.
*B25J 9/10* (2006.01)
*B25J 9/08* (2006.01)
*H02K 7/00* (2006.01)
*H02K 7/14* (2006.01)
*H02K 29/08* (2006.01)
*F16H 1/32* (2006.01)
*H02K 5/22* (2006.01)
*H02K 21/16* (2006.01)
*F16H 1/46* (2006.01)

(56) References Cited

U.S. PATENT DOCUMENTS

| | | | | |
|---|---|---|---|---|
| 4,716,785 | A | * | 1/1988 | Godai et al. .................... 74/640 |
| 4,766,775 | A | | 8/1988 | Hodge |
| 4,898,065 | A | * | 2/1990 | Ogata et al. .................... 475/179 |
| 5,293,107 | A | * | 3/1994 | Akeel ....................... 318/568.11 |
| 5,523,662 | A | * | 6/1996 | Goldenberg et al. .... 318/568.11 |
| 5,712,552 | A | | 1/1998 | Hirai et al. |
| 5,800,563 | A | | 9/1998 | Arbogast et al. |
| 5,910,720 | A | | 6/1999 | Williamson et al. |
| 6,084,373 | A | * | 7/2000 | Goldenberg et al. .... 318/568.11 |
| 6,323,615 | B1 | | 11/2001 | Khairallah |
| 6,454,624 | B1 | | 9/2002 | Duff et al. |
| 6,491,537 | B1 | | 12/2002 | Watanabe |
| 6,538,426 | B1 | * | 3/2003 | Enrietto et al. ............... 324/174 |
| 6,575,802 | B2 | | 6/2003 | Yim et al. |
| 6,605,914 | B2 | | 8/2003 | Yim et al. |
| 6,686,717 | B2 | | 2/2004 | Khairallah |
| 6,780,042 | B1 | | 8/2004 | Badescu et al. |
| 6,791,291 | B2 | | 9/2004 | Shimizu et al. |
| 7,296,835 | B2 | | 11/2007 | Blackwell et al. |
| 7,549,883 | B2 | | 6/2009 | Hillis et al. |
| 2005/0168183 | A1 | * | 8/2005 | Iribe et al. ................. 318/568.12 |
| 2005/0267600 | A1 | | 12/2005 | Haberman et al. |
| 2008/0129239 | A1 | | 6/2008 | Lee et al. |
| 2008/0276725 | A1 | | 11/2008 | Pusch |
| 2008/0288088 | A1 | * | 11/2008 | Langenfeld ............... A61F 2/54 623/57 |
| 2009/0192619 | A1 | | 7/2009 | Martin et al. |
| 2009/0227412 | A1 | | 9/2009 | Chang |
| 2011/0067517 | A1 | | 3/2011 | Ihrke et al. |

FOREIGN PATENT DOCUMENTS

| | | |
|---|---|---|
| EP | 0 251 918 A1 | 1/1988 |
| EP | 0 441 397 | 8/1991 |
| EP | 1 070 571 A1 | 1/2001 |
| JP | 61 001234 A | 1/1986 |
| JP | 2005 237168 A | 9/2005 |
| WO | WO 96/04493 A1 | 2/1996 |
| WO | WO 2008/068207 A1 | 6/2008 |
| WO | WO 2009/009673 A2 | 1/2009 |

OTHER PUBLICATIONS

Gombert et al., "Modular Concepts for a New Generation of Light Weight Robots", Industrial Electronics, Control and Instrumentation, vol. 3, pp. 1507-1514 (1994).

European Search Report of Corresponding European Application No. EP 12 16 7941, dated Jan. 28, 2013.

http://www.oandp.org./jpo/library/printArticle.asp?printArticleId=2 . . . , Journal of Prosthetics and Orthotics 2007, "The ToMPAW Modular Prosthesis: A Platform for Research in Upper-Limb Prosthetics", vol. 19, No. 1, p. 15 (8 pages).

http://www.jhuapl.edu/newscenter/pressreleases/2007/070426.asp, The Johns Hopkins University Applied Physics Laboratory, "Revolutionizing Prosthetics 2009 Team Delivers First DARPA Limb Prototype", Apr. 26, 2007 (3 pages).

Harshbarger, Stuart, The John Hopkins University Applied Physics Laboratory, Powerpoint Presentation, "Revolutionizing Prosthetics 2009", Dec. 2006 (19 pages).

http://www.medicalnewstoday.com/printerfriendlynews.php?newsid . . . , Medical News Today, "Revolutionizing Prosthetics 2009 Team Delivers First DARPA Limb Prototype", May 2, 2007 (3 pages).

Beard, Jonathan, *50 Years of Bridging the Gap*, "Darpa's Bio-Revolution", DARPA pp. 155-161, Circa Apr. 2008.

Murata, Satoshi et al., "Hardware Design of Modular Robotic Systems", Proc. of 2000 IEEE/RSJ Int. Conf. on Intelligent Robots and Systems (IROS 2000), CD-ROM, F-AIII-5, 2000, 8 pages.

Yim, Mark et al., "Towards Robotic Self-Reassembly After Explosion", 2007, 7 pages.

Yim, Mark et al., "Modular Robots", IEEE Spectrum, Feb. 2002, pp. 30-34.

Yim, Mark et al., "Modular Self-Reconfigurable Robot Systems, Challenges and Opportunities for the Future", IEEE Robotics & Automation Magazine, Mar. 2007, pp. 43-52.

Yim, Mark et al., "Modular Reconfigurable Robots in Space Applications", Autonomous Robots, 14, 2003, pp. 225-237.

Salemi, Behnam et al., "SUPERBOT: A Deployable, Multi-Functional, and Modular Self-Reconfigurable Robotic System", Proceedings of the 2006 IEEE/RSJ International Conference on Intelligent Robots and Systems, Oct. 9-15, 2006, Beijing, China, pp. 3636-3641.

Castano, Andres et al., "Mechanical Design of a Module for Reconfigurable Robots", Proceedings of the 2000 IEEE/RSJ International Conference on Intelligent Robots and Systems, 2000, pp. 2203-2209.

Chiang, Chih-Jung et al., "Modular Robot Motion Planning Using Similarity Metrics", Autonomous Robots, 10, 2001, pp. 91-106.

Jantapremjit, Pakpong, et al., "Design of a Modular Self-Reconfigurable Robot", Robotic Systems Laboratory, The Australian National University, Canberra, Australia, 6 pages.

Jorgensen, Morten Winkler, et al., "Modular ATRON: Modules for a Self-Reconfigurable Robot", Proceedings of 2004 IEEE/RSJ International Conference on Intelligent Robots and Systems, Sep. 28-Oct. 2, 2004, Sendai, Japan, pp. 2068-2073.

Khoshnevis, Behrokh et al., "Reconnectable Joints for Self-Reconfigurable Robots", Information Sciences Institute, Marina del Rey, California and Department of Industrial and Systems Engineering, University of Southern California, Los Angeles, California, 6 pages.

Duff, David G. et al., "Evolution of PolyBot: A Modular Reconfigurable Robot", Palo Alto, California, 7 pages.

* cited by examiner

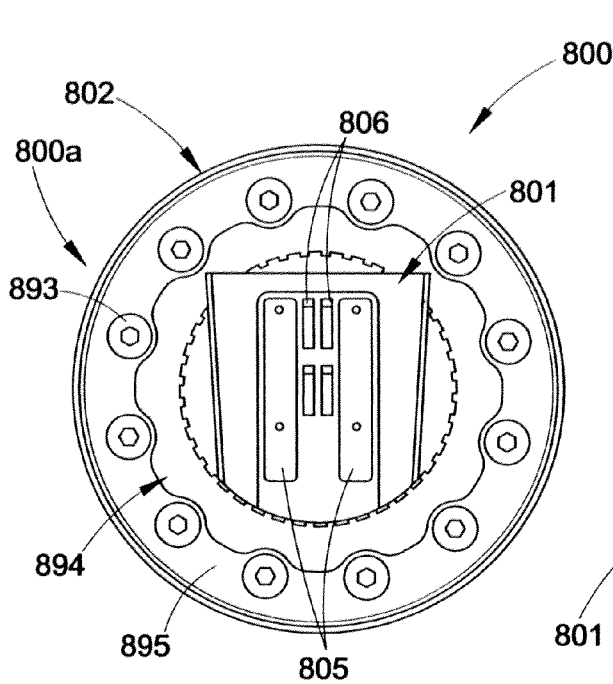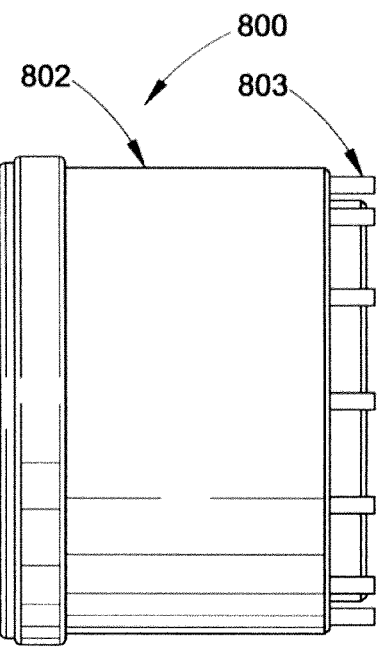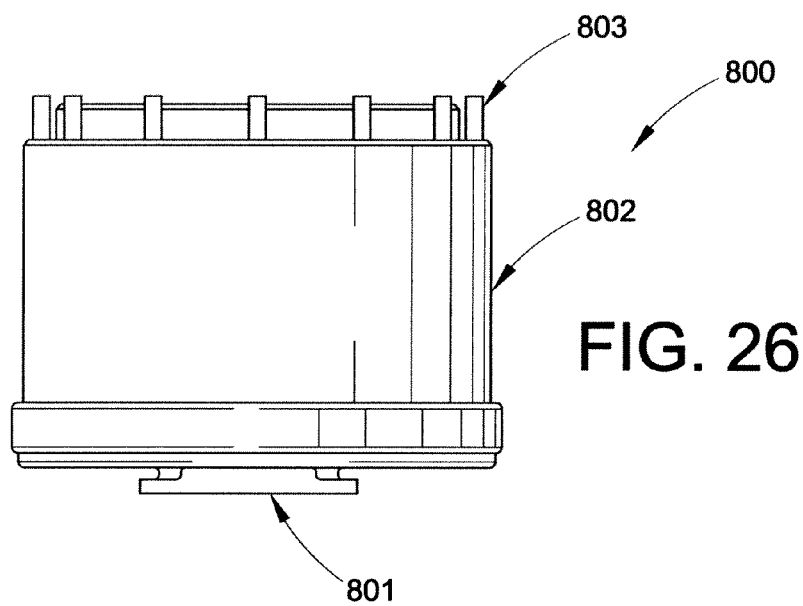

MODULAR ROTATIONAL ELECTRIC ACTUATOR

CROSS-REFERENCE TO RELATED APPLICATIONS

This application claims priority to and the benefit of U.S. Provisional Patent Application Ser. No. 61/485,848, filed May 13, 2011, entitled ROBOTIC LIMB DRIVE, the entirety of which is hereby incorporated by reference.

BACKGROUND

The present disclosure relates generally to rotational electric actuators. More particularly, it relates to modular actuators for manmade or artificial limbs for robotic prosthetic or orthotic devices, and the like.

Prior art prosthetic robotic arms cannot produce torque, strength, or lift capability comparable to a human arm within the dimensions and weight of the average human arm. Stated differently, prosthetic robotic arms simply do not have the same power density as does a human arm. The electromechanical devices which drive the prior art robotic limbs are bulky, heavy, and inefficient. Moreover, these prior art limbs require generous power sources which typically involves the use of numerous batteries or bulky external power supplies thereby further adding to the weight of the system. Such increased weight limits the portability and ergonomics of a prosthetic or robotic limb.

In addition, limbs such as arms, whether for prosthetics or robotics, are assembled with custom bolted and screwed mechanical connections that are different for each joint. These mechanical connections may or may not include the electrical interconnections between adjacent arm components. Typical solutions can include complex wiring harnesses that require bulky electrical connectors or solder connections. Such solutions are disadvantageous because they only work for a specific joint. In other words, they are not usable for joints between multiple arm modules.

Although prosthetic technology has advanced in recent years, the prior art still has failed to bridge the gap between manmade prosthetics and user demands and needs. Therefore, an extensive opportunity for design advancements and innovation remains where the prior art fails or is deficient. Most myoelectric prosthetic arms move in three ways. They bend at the elbow, rotate at the wrist and a rudimentary hand clamps shut. A need exists to replicate the great many varieties of movements that a human arm is capable of making. It is believed that a human arm has 27 degrees of freedom, including individual finger bending, and the use of an opposable thumb. Robotic arms used as prostheses are not fully articulated to give the user the same degrees of freedom as a natural arm, not to mention the speed and torque of a human arm. Moreover, the human arm can sense pressure, which conventional man-made arms cannot do. It would be advantageous if the prosthetic or robotic arm was sensitive enough to pick up a piece of paper, a wine glass, or even a grape yet powerful enough to handle the lifting of moderate to heavier weight items without mishap.

While many advances have taken place to allow for better prosthetics and orthotics, as well as more functional robotic limbs, there remains a need to develop more compact, lightweight, and powerful high torque limb drives. In addition, there exists a need to connect the various segments of a limb to the limb drives so that the segments can be more readily attached and detached in a simple manner, without external wiring, and in a manner that provides a weather tight seal. It would also be advantageous to provide integral torque and/or position sensing for determining the loads and stresses in the limb as well as the relative positioning of the individual limb segments, and to include a series elastic element in this assembly to reduce impact loads and to improve the bandwidth of torque and impedance control of the limb segment.

BRIEF DESCRIPTION

In some illustrative embodiments disclosed as illustrative examples herein, a modular rotational electric actuator includes an output housing including a front housing portion and a rear housing portion. The output housing includes internal drive components that are operatively located within the output housing. Additionally, the output housing includes control electronics that are integrated within the output housing, and which are in communication with the internal drive components. The control electronics include at least one sensor that is operatively coupled to at least one of the internal drive components, which provides at least one signal or value to the control electronics indicating a position, a torque, a load, or a speed associated with the actuator.

In some illustrative embodiments disclosed as illustrative examples herein, a modular rotational actuator includes an output housing and internal drive components including integrated control electronics that are mounted within the output housing. The internal drive components include a first gear train and motor assembly which includes at least one friction planetary gear assembly and a motor, the at least one friction planetary gear assembly positioned within a rotor of the motor. The internal drive components also include a second gear stage assembly that includes at least one cycloidal gear assembly, and a dual surfaced cam that couples the friction planetary gear assembly to the cycloidal gear assembly. In addition, the modular rotational actuator includes a portion of a joint assembly comprising a joint connector that is coupled to the internal drive components including integrated control electronics by a resilient member. The resilient member elastically couples the joint connector to a portion of the output housing, the joint connector including a portion that extends outward from the portion of the output housing.

BRIEF DESCRIPTION OF THE DRAWINGS

The present disclosure may take form in certain parts and arrangements of parts, several embodiments of which will be described in detail in this specification and illustrated in the accompanying drawings which form a part hereof and wherein:

FIG. 24 is a front view of the robotic limb drive of FIGS. 22A-B, illustrating a joint connector assembly.

FIG. 25 is a side view of the modular rotational electric actuator of FIGS. 22A-B.

FIG. 26 is a top view of the modular rotational electric actuator of FIGS. 22A-B.

DETAILED DESCRIPTION

Figure 1:
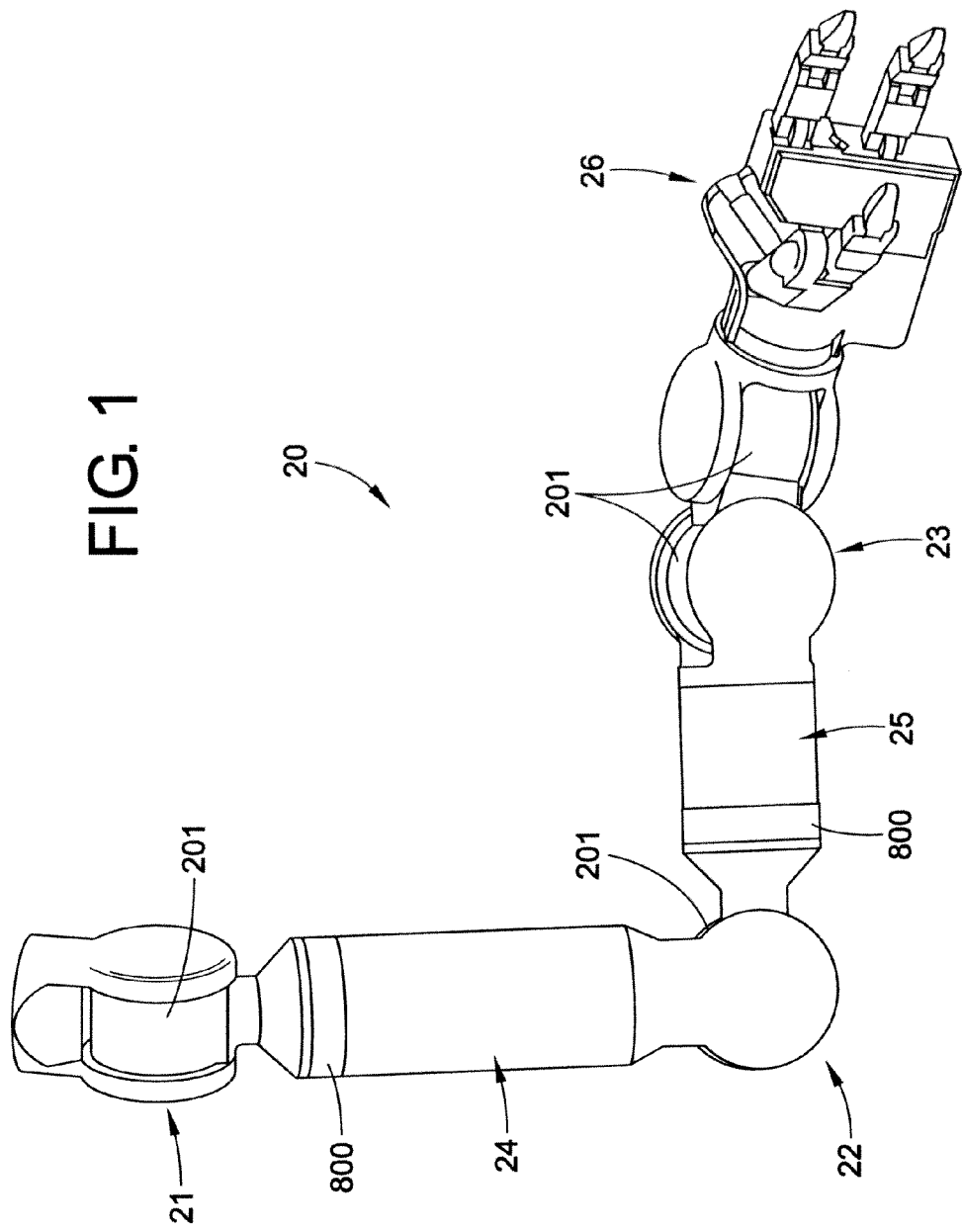
FIG. 1 is a perspective view of a modular rotational electric actuator including a first embodiment and a second embodiment of a modular rotational electric actuator, in accordance with one aspect of the present disclosure.
Figure 2:
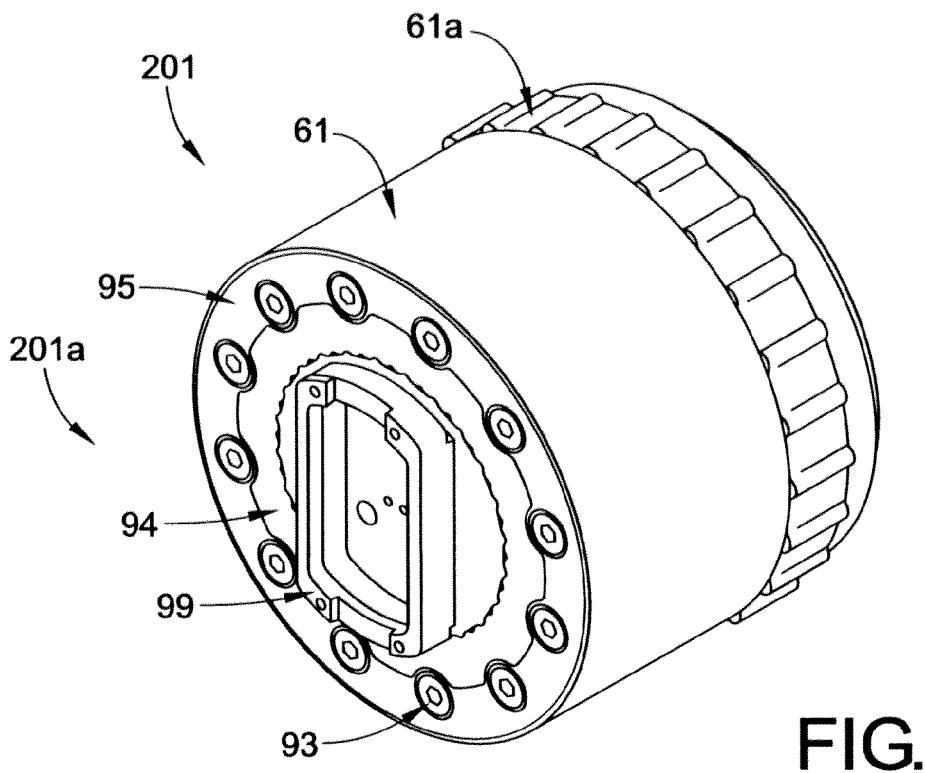
FIG. 2 is a front perspective view of the first embodiment of the modular rotational electric actuator, also referred to herein as an actuator.

With reference to FIG. 1, an artificial or robotic limb 20 is shown, according to one embodiment of the present disclosure. By way of example, the robotic limb 20 may comprise an arm that includes a number of rotatable joints, such as a shoulder joint 21, an elbow joint 22, and/or a wrist joint 23. In addition, the robotic limb 20 may include one or more rotatable limb or arm segments 24, 25. A series of electromechanical robotic limb modular rotational electric actuators can be incorporated into either or both of the joints or limb segments for the purpose of moving a manipulator 26 or other object (e.g., tool, surgical device, weapon, etc.) in a prescribed manner necessary to perform a particular task or operation. A first embodiment of a modular rotational electric actuator 201 (also referenced herein as an actuator) is particularly adapted to be used at radial joint locations (such as the shoulder 21, elbow 22, and/or wrist 23). By comparison, a second embodiment of a modular rotational electric actuator 800 (also referenced herein as an axial actuator) can be used in conjunction with or integrated into the limb segments (such as the arm segments 24, 25) where the desired rotation is axially oriented (or about a longitudinal axis of the limb segments) rather than a sweeping or radially oriented rotation.

With reference to FIGS. 2-6, the first embodiment of the modular rotational electric actuator or actuator 201 is illustrated. Generally, the external features of the actuator 201 include an output housing 61 which may include a series of raised features or keys 61a for maintaining positive engagement between the output housing 61 and the object or joint to be driven by the actuator 201. In addition, a front portion 201a includes a joint connector 99. The joint connector 99 forms one-half of a modular joint assembly which permits "modular" limb joints or limb segments to be quickly and securely engaged or disengaged from one another (which is discussed in great detail below). That is, the joint connector 99 may be comprised of a male joint connector portion and a female joint connector portion. The male joint connector may be comprised of a protruding, load-bearing blade that is configured to mate with a socket of a female joint connector (discussed more fully with respect to FIGS. 22-26). Unless specified, the "joint connector 99" used hereinafter may refer to the male portion, the female portion, or both. It will be appreciated that the joint connector 99 may be implemented as a quick connect, quick disconnect type joint, such that the blade (male) and socket (female) portions of the connector 99 enables the quick connection of multiple actuators 201. A locking member (not shown) may be used to secure the male and female portions of the joint connector 99 when connecting multiple actuators 201.

In one embodiment, the actuator 201 may include a male portion of a joint connector 99 on the front housing portion 201a and an oppositely position female portion of a joint connector 99 on a rear housing portion 201b, or vice versa. Thus, multiple actuators 201 may be connected male to female. Other embodiments contemplated herein may include only a single portion of the joint connector 99, i.e., only the male portion or only the female portion, depending upon the application in which the actuator 201 is implemented. The joint connector 99 may be coupled to the internal drive components 900 via a resilient member 94. The resilient member 94, e.g., a "spring" or torsion member, allows for an elastic coupling between the joint connector 99 and the housing 61 of the actuator 201. The resilient member 94 can be fabricated from any suitable elastic or resilient material such as a urethane based material. A series of fasteners 93 and a retaining member 95 can be used to secure the joint connector 99 to the internal drive components 900 of the actuator 201.

Figure 3:
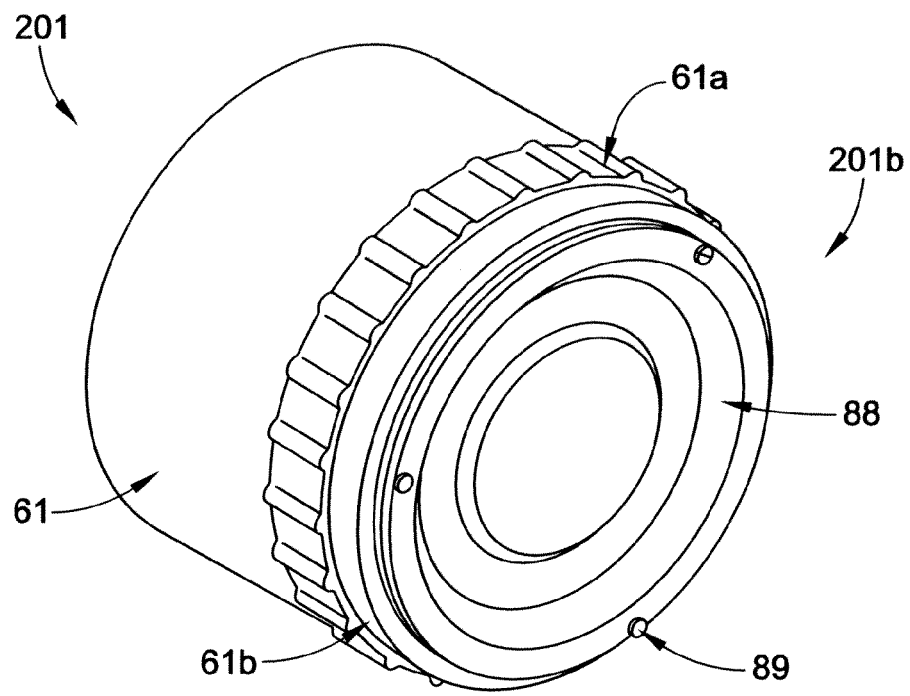
FIG. 3 is a rear perspective view of the modular rotational electric actuator of FIG. 2.

With reference to FIG. 3, a rear portion 201b of the actuator 201 is illustrated and includes an external cover 88 which may be secured to the housing 61 using a plurality of fasteners 89. In addition, the actuator 201 may include an external bearing 61b located substantially adjacent to the series of raised features or keys 61a at the rear portion 201b of the output housing 61 of the actuator 201. The external bearing 61b may provide support to the actuator 201 within a radial joint connection of the robotic limb and to aid in the alignment of the internal drive components 900, particularly when the joint is subject to high loads.

Figure 4:
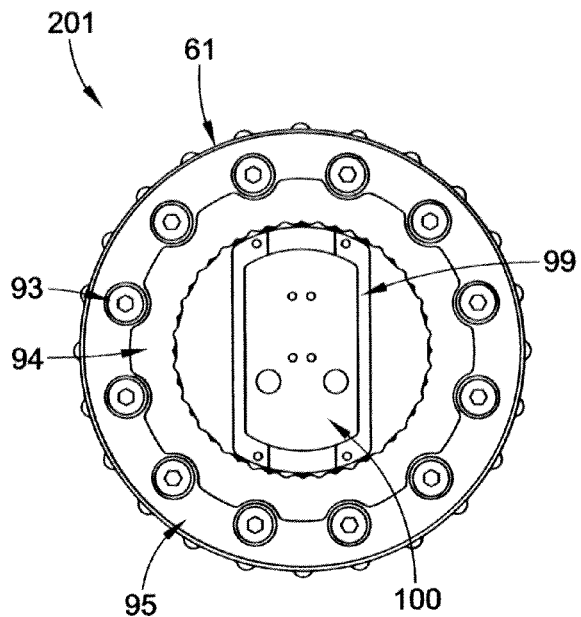
FIG. 4 is a front view of the modular rotational electric actuator of FIG. 2.
Figure 5:
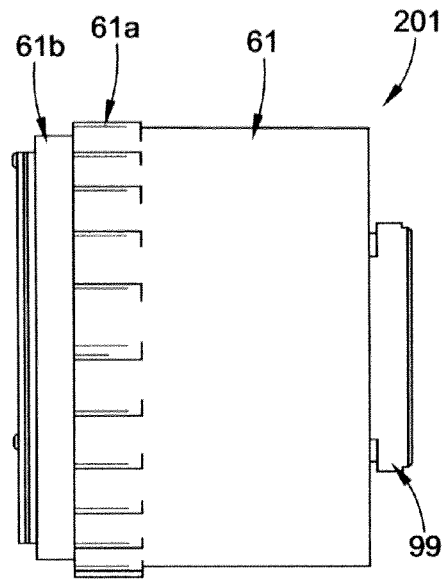
FIG. 5 is a side view of the modular rotational electric actuator of FIG. 2.
Figure 6:
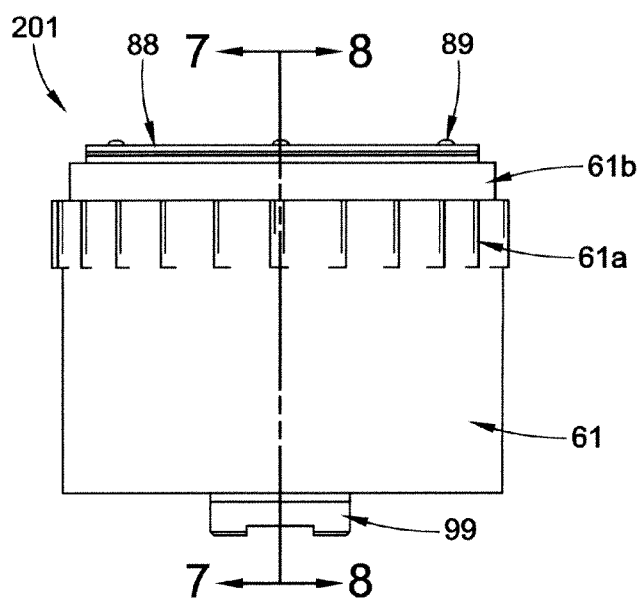
FIG. 6 is a top view of the modular rotational electric actuator of FIG. 2.

Now with reference to FIGS. 4-6, various views of the actuator 201 are shown further illustrating the previously described features. In addition, a strain gage board assembly 100 is illustrated. This may include a series of electrical connections and other torque sensing components for sensing the load and/or torque being transmitted between the joint connector 99 and the output housing 61. The transmitted load can be measured by means of strain gages or any other stress, strain, or position sensing device. A more detailed discussion with regard to the torque sensing aspect of the present disclosure is provided below with reference to FIGS. 19-21.

Figure 7:
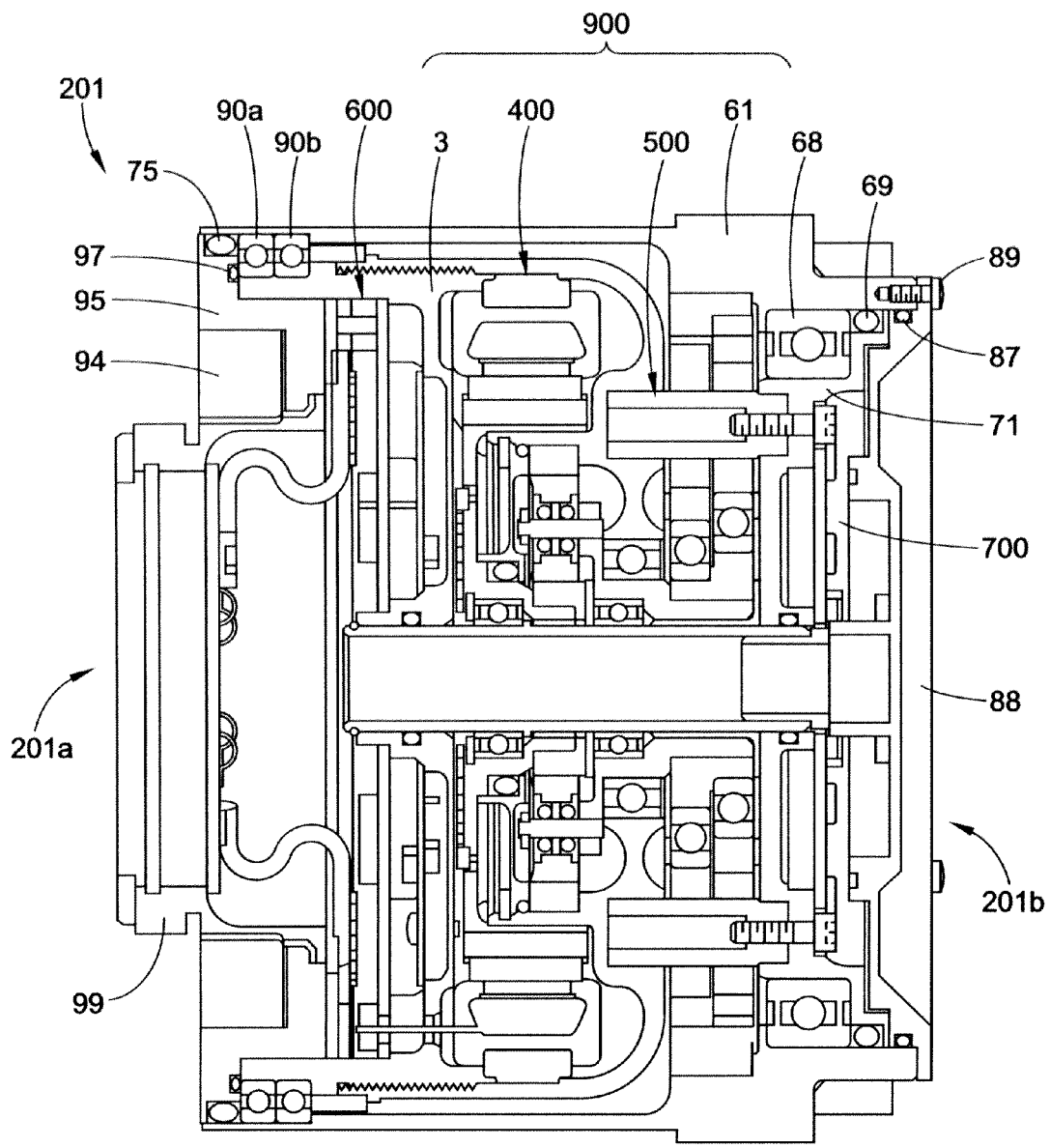
FIG. 7 is an enlarged cross-sectional view of the modular rotational electric actuator of FIG. 6 along a section line 7-7.
Figure 8:
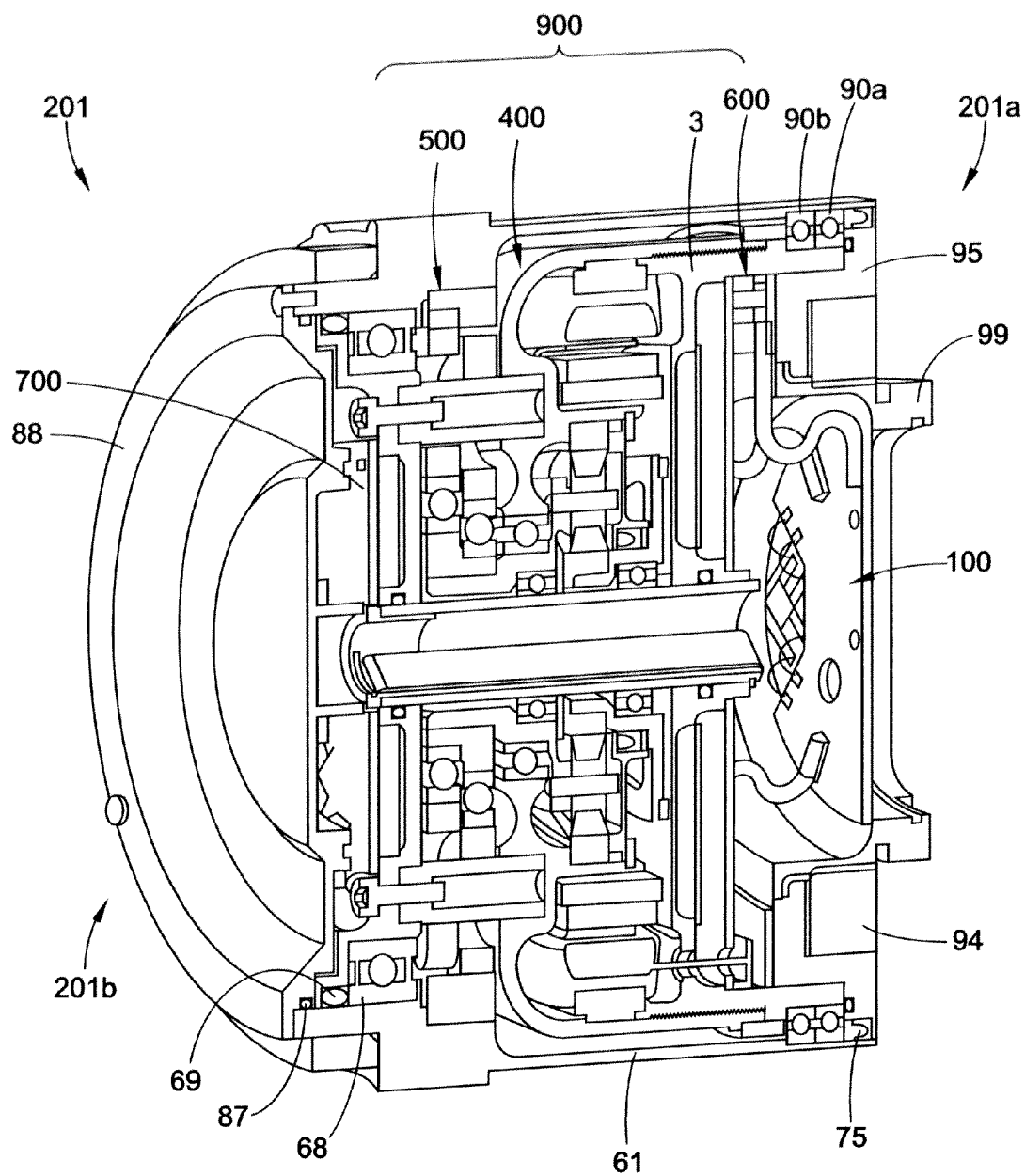
FIG. 8 is an enlarged perspective cross-sectional view of the robotic limb drive of FIG. 6 along a section line 8-8.
Figure 9:
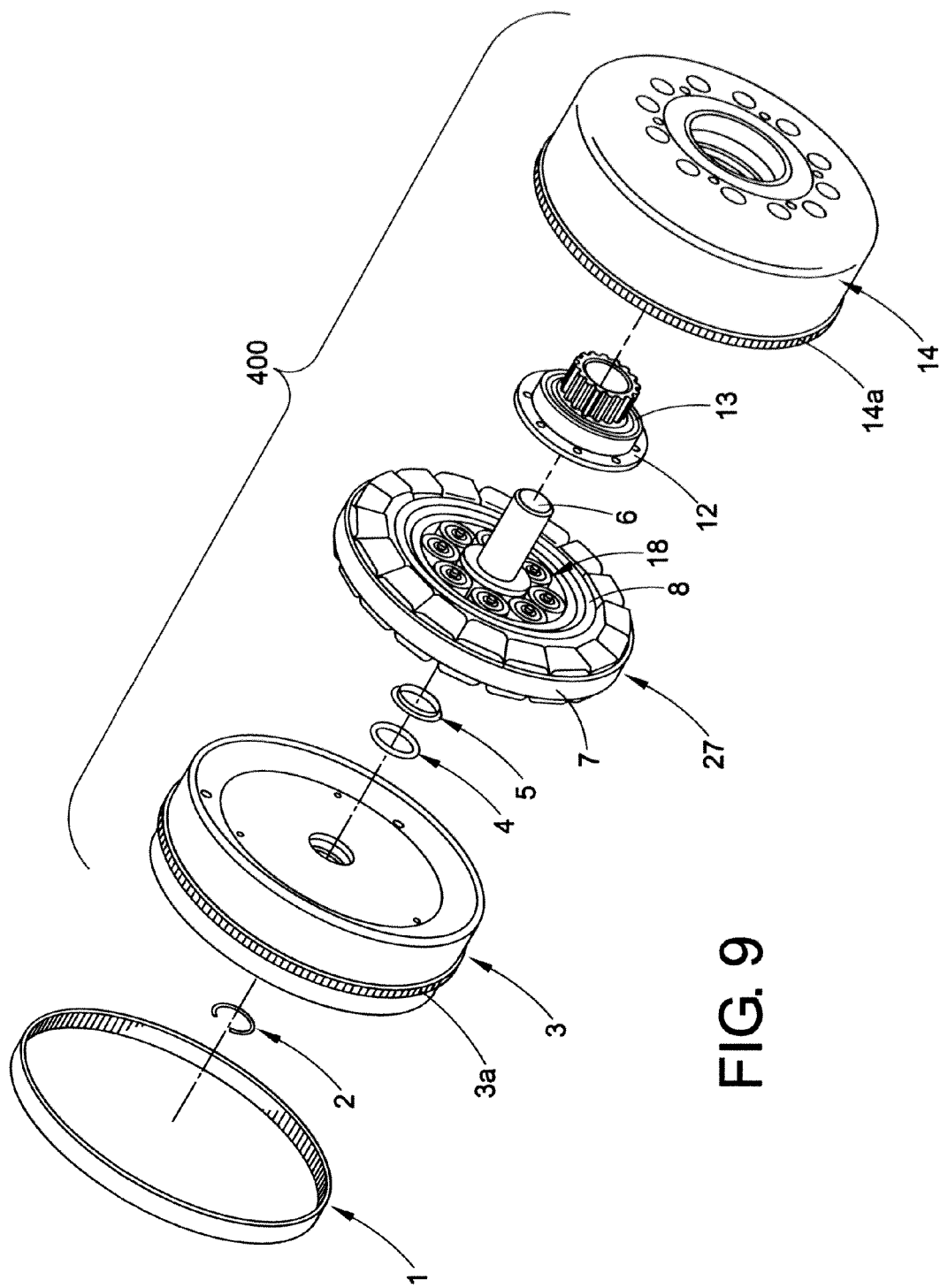
FIG. 9 is a partial exploded view of a first stage gear train assembly of the modular rotational electric actuator of FIG. 2.

With regard to FIGS. 7 and 8, a cross-sectional view of the actuator 201 is illustrated showing the various internal drive components 900 in a fully assembled state. Generally, the internal drive components 900 of the actuator 201 may include a first stage gear train and motor assembly 400, a second stage gear train assembly 500, a first electrical compartment 600 and a second electrical compartment 700. It should be noted that the present disclosure is not limited to the gear train arrangement depicted in the figures. A direct drive, single stage, or multi-stage reduction system could be used. In addition, a number of bearings are used to support the internal drive components 900 and to maintain axial alignment within the housing 61. At the forward portion 201a, a pair of ultra slim ball bearings 90a, 90b can be used to support the forward end of the internal drive components 900 in relation to the housing 61. Similarly, a ball bearing 68 can be used to support the rear portion of the internal drive components 900 with respect to the housing 61. In addition, one or more seals 69, 75, 87 and 97 can be used to prevent internal lubricants from leaking past the ends of the housing 61 and to prevent foreign materials from contaminating or otherwise interfering with the internal drive components 900.

Now with reference to FIGS. 9-12, the motor and first stage gear train assembly 400 is shown in various exploded views. The motor and first stage gear assembly 400 generally includes a motor 27, a planetary gear train assembly 18 and an output carrier 12. All of these components can be housed within or between a motor side housing 3 and a planetary gear side housing 14. Both the motor side housing 3 and the planetary gear side housing 14 may include a series of raised or external locking teeth 3a, 14a which, when the housings 3, 14 are mated together are aligned with and engage the interlocking member 1. This locking arrangement maintains the motor side housing 3 in static relationship with the gear side housing 14. Of course, other keying or locking arrangements can be contemplated.

Figure 10:
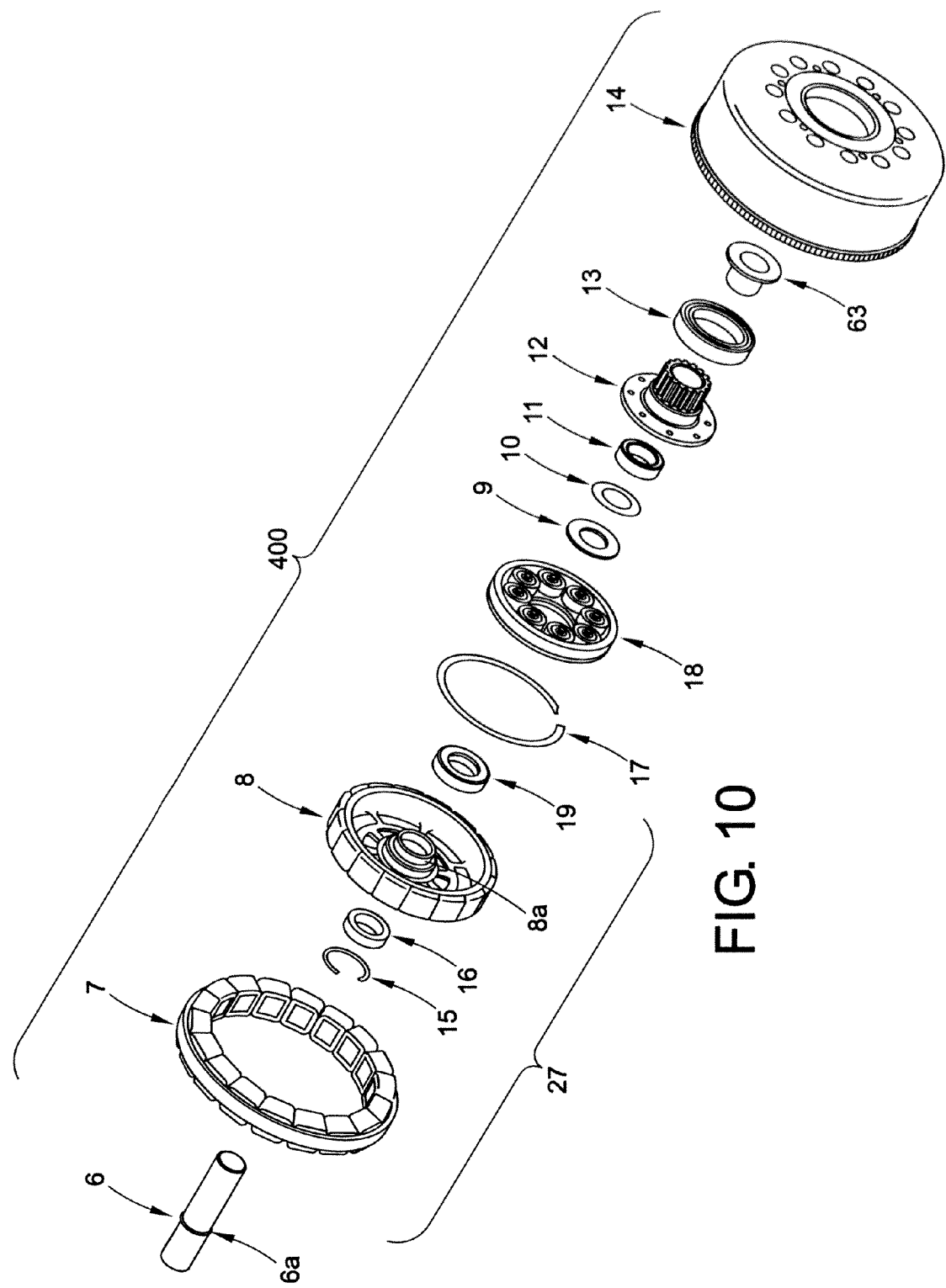
FIG. 10 is a further exploded view of a portion of FIG. 9, illustrating a motor and a planetary gear set of the first stage gear train in greater detail.

With reference to FIG. 10, a more detailed exploded view of the motor assembly 27 and the planetary gear train assembly 18 is there depicted. In particular, the motor assembly 27 includes a stator 7, rotor 8, a rotor retaining ring 15, and a rotor bearing 16. The stator 7 can be fixed to the motor side housing 3 (FIG. 9) while the rotor 8 is free to rotate via the rotor bearing 16 on a through shaft 6. In addition, the rotor 8 can carry the planetary gear train assembly 18 within a central region of the rotor 8. The planetary gear train assembly 18 forms the first stage of gear train using the output of the motor 27 (i.e., the rotor 8) as an input. In this embodiment, a sun gear 19 of the planetary reduction is secured to a sun gear hub 8a in the central region of the rotor 8. As is more clearly illustrated and discussed with reference to FIGS. 11-12 below, the sun gear 19 rotates causing a set of planets 34 to rotate an output or carrier 12. Various bearings, bushings, washers and retainers may also be used to maintain the proper spacing and alignment throughout the first stage gear train assembly 400. These could be, for example, an oil cover retaining ring 17, a rotor plain bearing 9, a rotor shim 10, an inner carrier bearing 11, an outer carrier bearing 13, and a plain carrier bearing 63. Through shaft 6 may also be used to hold these various bearings, shims and/or retainer rings in axial alignment and in place with the modular rotational electric actuator 201.

Figure 11:
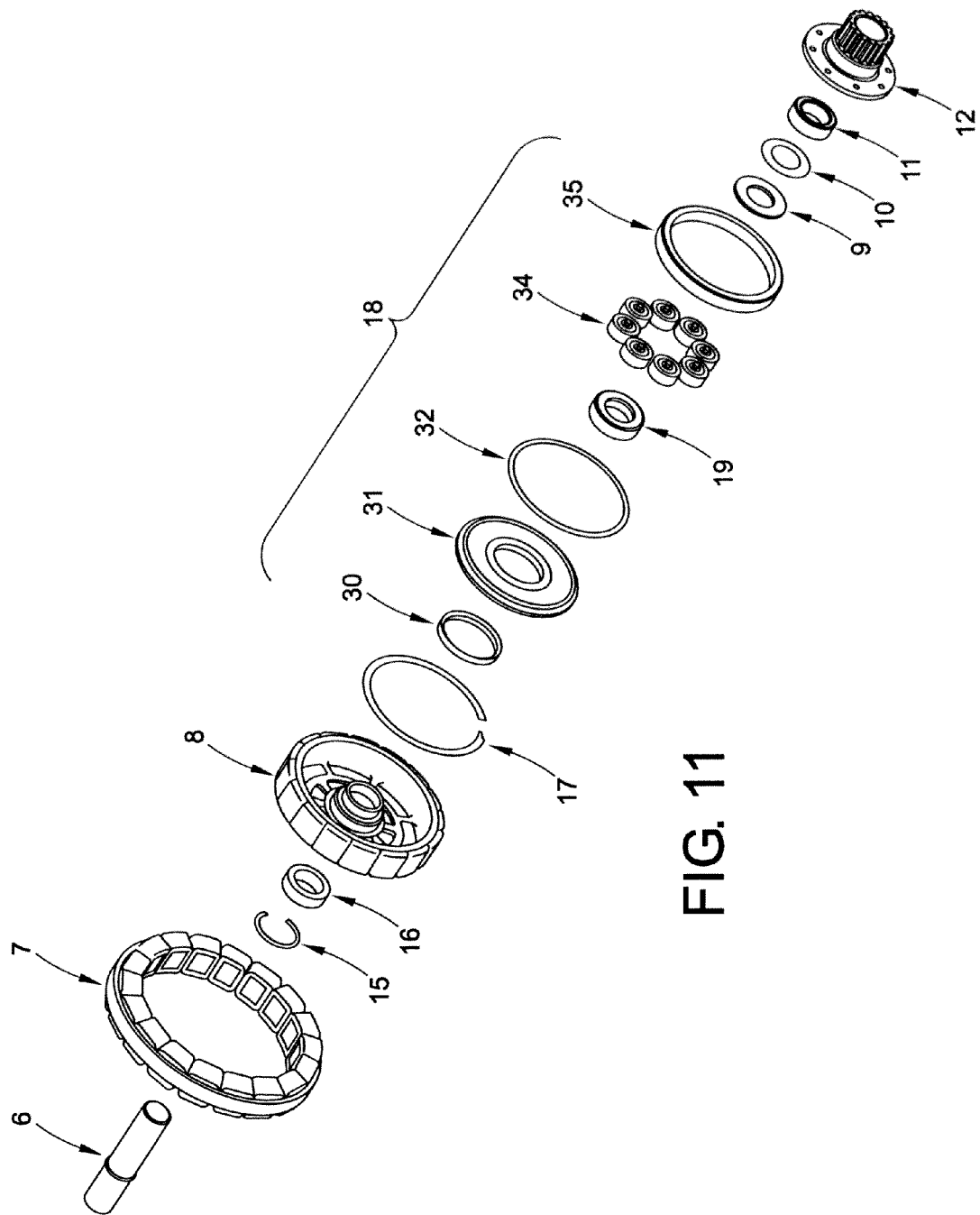
FIG. 11 is a further exploded view of a portion of FIG. 10, illustrating the planetary gear set in still greater detail.
Figure 12:
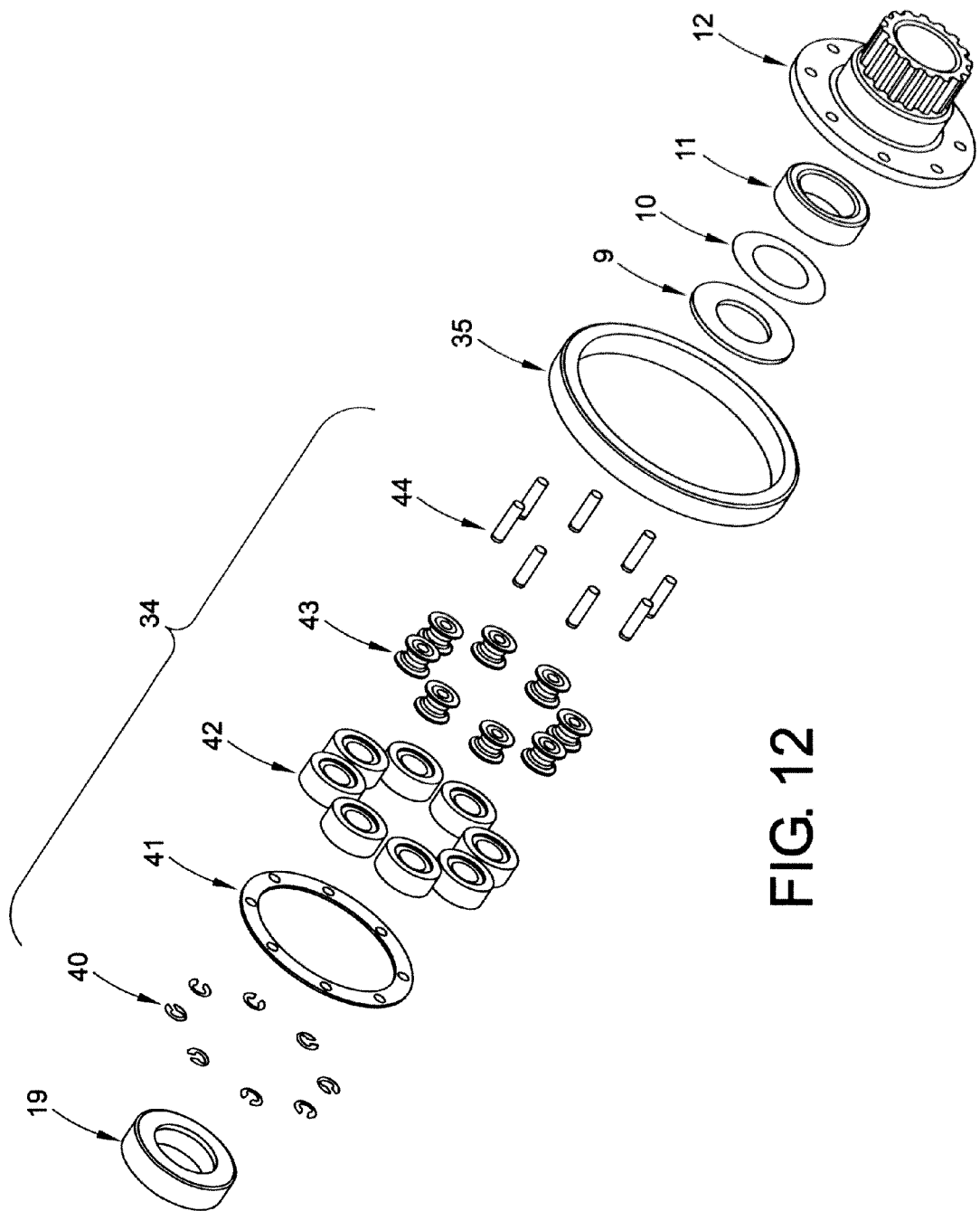
FIG. 12 is a further exploded view of a portion of FIG. 11, illustrating the planetary gear set in still even greater detail.

Now with reference to FIG. 11, a still further exploded view of FIG. 10 illustrates the internal components of the planetary gear train assembly 18 in greater detail. For example, a set of planetary gears 34, a planetary ring gear 35, sun gear 19, a rotor seal 30, an interior oil cover 31, and an 'O' ring oil seal 32 are all illustrated. FIG. 12 is yet still a further exploded view of the planetary gear train set of 18 and 34. These subassemblies can further include a number of E-ring carrier pins 40, a planet support ring 41, a plurality of planet gears 42, a plurality of planet bearings 43 and a plurality of planet pins 44. According to one embodiment, the set of planetary gears 34, a planetary ring gear 35, and sun gear 19 are implemented as friction gears.

Generally, the operation of the illustrated and above described combined motor and first stage gear train assembly 400 is as follows: 1) first the stator 7 of the motor 27 is electrically energized creating a magnetic field; 2) depending on the field polarity, permanent magnets 52 (FIG. 13) located about the rotor 8 are urged in either a forward or reverse direction causing the rotor 8 to rotate accordingly; 3) the rotating rotor 8 causes the sun gear 19 to rotate to which in turn causes the planet assembly 34 to rotate around the sun gear 19; 4) as the planets or planet assembly 34 rotates, planet pins 44 urge the output or carrier 12 to rotate in a gear reduced fashion having lower speed than the rotor 8 itself, but with greater torque capacity. As the output of the motor and first stage gear assembly 400, the carrier 12 also serves as the input to the second stage gear train assembly 500 which will be discussed in greater detail below.

Figure 13:
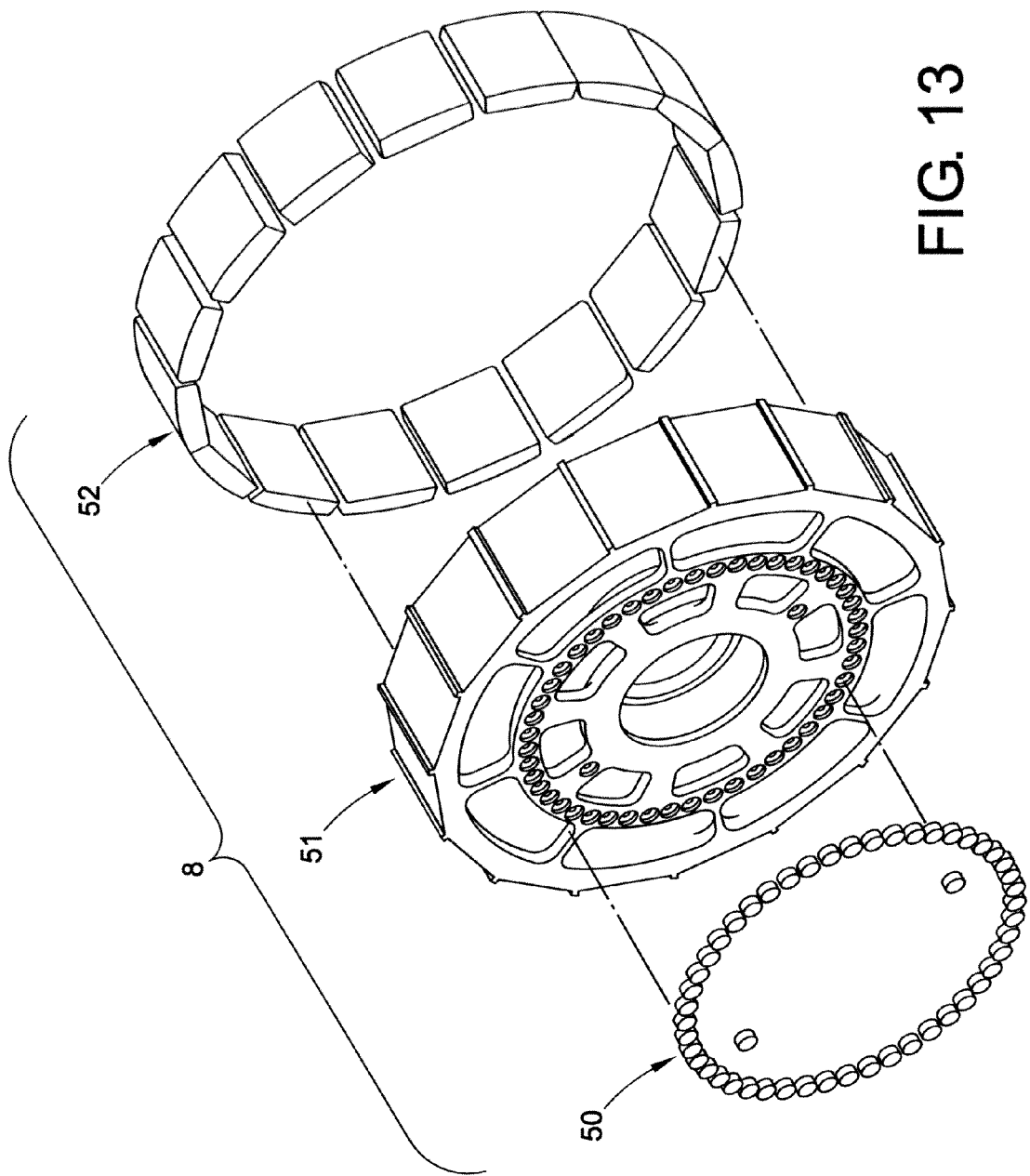
FIG. 13 is an exploded view of a rotor assembly of the motor illustrated in FIG. 10.

With reference to FIG. 13, an exploded view of the rotor 8 of the motor assembly 27 is shown. As illustrated, the rotor 8 further includes a rotor hub 51 which may include a series of magnets 50 disposed in a circular, i.e., circumferential, fashion about the axis of rotation of the rotor hub 51. The purpose of the magnets 50 is to provide position and/or speed sensing for determining the angular velocity and/or relative position of the output of the actuator 201. The magnets 50, or any other position sensing feature, can be used alone or in conjunction with other electronics provided within the modular rotational electric actuator 201. According to one embodiment, two stationary Hall-Effect sensors are spaced 90 degrees apart to measure the movement of the magnets 50. The magnets 50 may alternate in polarity from North to South. A highly-accurate angular position of the rotor 8 may be produced at a high sampling rate by taking the arc-tangent of the signal intensity form the Hall-Effect sensors. It will be appreciated that the accuracy of such a measurement may facilitate a highly efficient commutation of the motor 27 (and therefore increased motor efficiency), as well as greater degrees of positioning of the limb 20-23, 26. Finally, a series of permanent magnets 52 (or any other magnetically sensitive component) may be used to line the external circumference or perimeter of the rotor hub 51 for generating a rotation of the rotor 8 upon excitation of the stator field 7 (FIG. 10).

Figure 14:
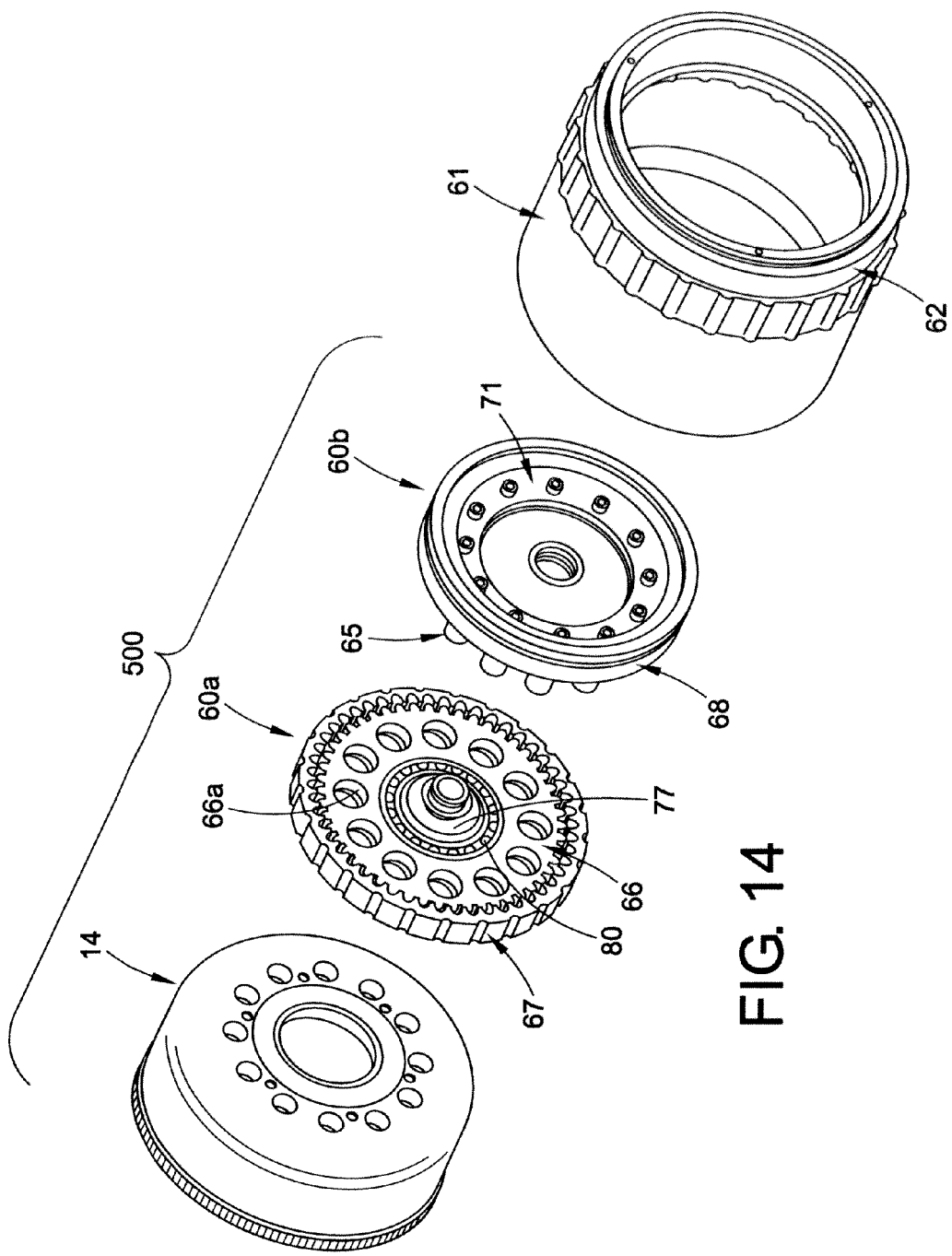
FIG. 14 is an exploded view of a second stage gear train assembly of the modular rotational electric actuator of FIG. 2.
Figure 15:
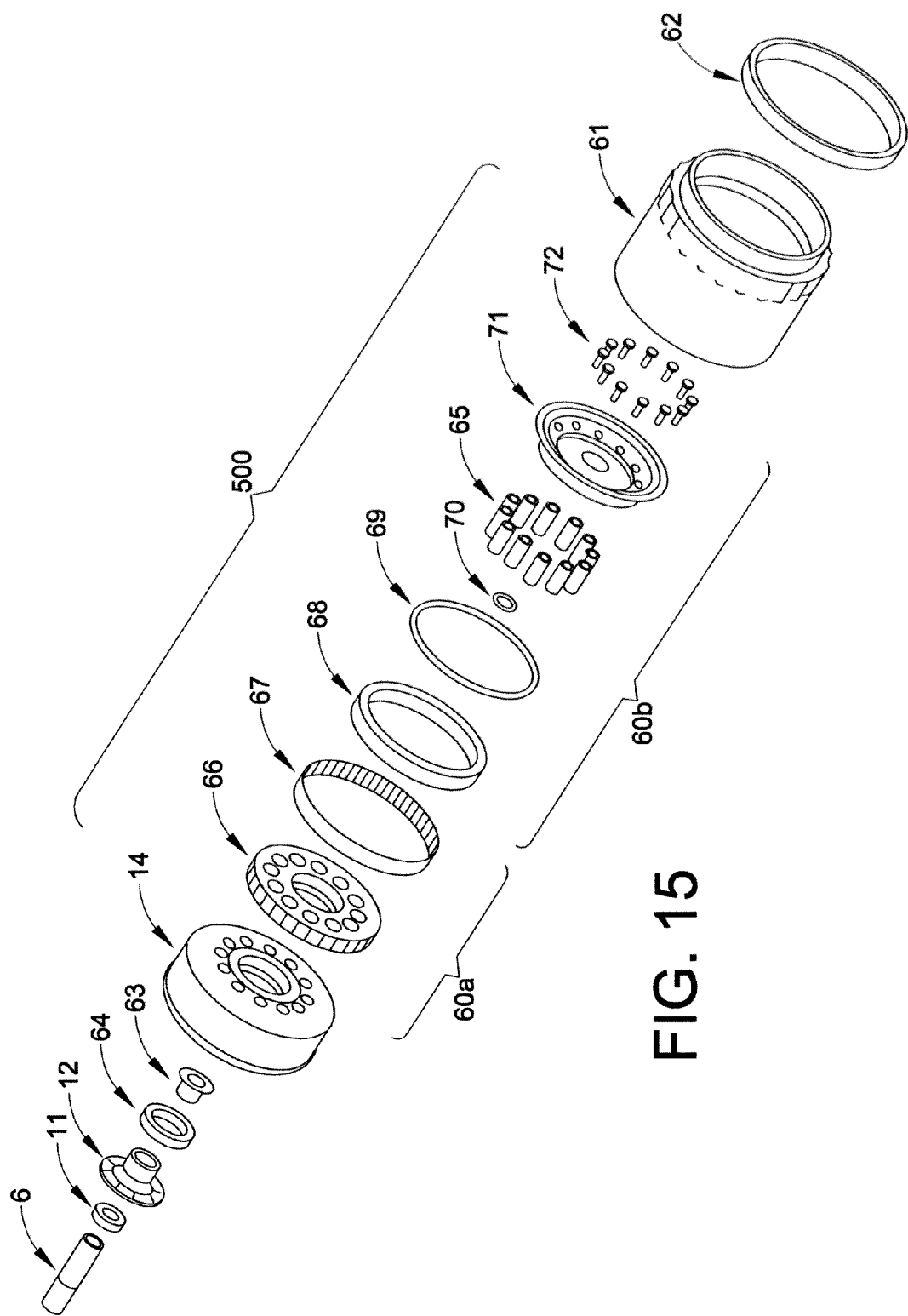
FIG. 15 is a further exploded view of the second stage gear train assembly of FIG. 14, illustrating a cycloidal gear train and pin support assembly in greater detail.

Now with reference to FIG. 14, the second stage gear train assembly 500 is there shown. In general, the second stage gear train 500 can include in this embodiment a cycloidal planet gear assembly 60a and a pin support assembly 60b. The cycloidal gear assembly 60a further includes two cycloidal planet gears 66 which "wobble" within a cycloidal ring gear 67. By way of example only, such a gear design is described in U.S. Pat. No. 5,505,668 to Koriakov-Savoysky, et al. Of course, other cycloidal or other high reduction gear assemblies could be used. The cycloidal planet gears 66 may be implemented as friction-type gears, toothed-type gears, or the like. The cycloidal planet gears 66 are set into a cycloidal "wobble" motion via the rotation of a cycloidal planet gear cam 77. The cam 77 is rotated by the carrier 12 from the output of the first stage gear train assembly 400. While two cycloidal planet gears 66 are shown in the instant embodiment, more or less than that number of cycloidal planet gears 66 could be used depending on the torque, weight, and overall size requirements or limitations. The pin support assembly 60b includes a series of pins 65 which extend through a series of apertures 66a in the cycloidal planet gears 66. With reference now to FIG. 15, the pin support assembly 60b can include a pin support member 71 to which the pins 65 are fastened via a plurality of fasteners 72. Furthermore, the pin support assembly can include an output bearing 68, a drive seal 69, and an O-ring seal 70.

Figure 16:
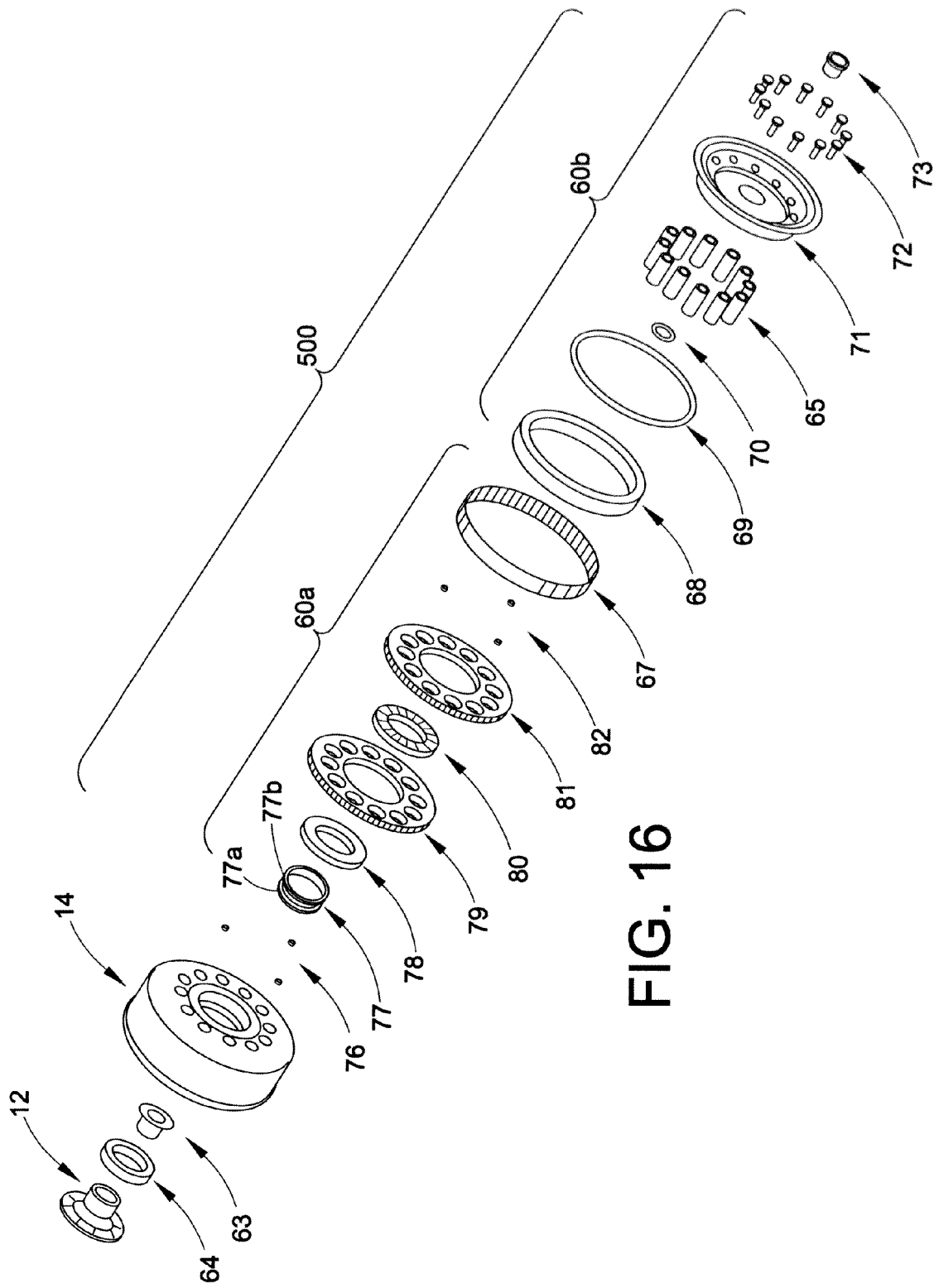
FIG. 16 is a further exploded view of the second stage gear train assembly of FIG. 15, illustrating the cycloidal gear train and pin support assembly in even greater detail.

With reference to FIG. 16, a further exploded detailed view of the second stage gear train assembly 500 is shown illustrating the individual components of the cycloidal gear train assembly 60a and the pin support assembly 60b. It should be noted that the cycloidal gear assembly 60a further includes a first and second planet cam bearing 78, 80 for supporting the first and second cycloidal planet gears 79, 81 on the respective cam lobes 77a, 77b of the cam 77. Moreover, a series of spacers 76, 82 may be used to prevent rubbing and wear between the cycloidal planet gears 79, 81 and the adjoining first stage gear train housing 14, as well as the pin support member 71.

The operation of the second stage gear train assembly 500 is as follows: 1) first, the output of the first stage gear train assembly 400 (carrier 12) rotates as discussed previously; 2) the rotating carrier 12 causes the cycloidal planet gear cam 77 to rotate; 3) as the cam 77 rotates, the cam lobes 77a, 77b on the cam 77 also rotate, causing the cycloidal planet gears 79, 81 to oscillate or wobble in a generally eccentric pattern about the series of pins 65 and the axis of rotation of the carrier 12; however, it should be noted that the cycloidal planet gears 79, 81 do not themselves rotate about the axis of rotation of the carrier 12; 4) the eccentric oscillation of the cycloidal planets 79, 81 causes the external teeth of the cycloidal planet gears 79, 81 to engage the internal teeth on the ring gear 67; 5) for every rotation of the cam 77, the cycloidal planet gears 79,81 advance one tooth on the ring gear 67, thus achieving a tremendous torque advantage and speed reduction in an extremely compact space; 6) as the cycloidal planet gears 79,81 wobble about the axis of rotation, they urge the cycloidal ring 67 of the second gear train stage to rotate in the same direction as the wobble motion of the cycloidal planet gears 79, 81; 7) this causes the output housing 61 to rotate in concert thereby forming the "output" of the second stage gear train assembly 500. With reference again to FIG. 3, this final output torque is then transferred from the motor 27 and through both gear train stages 400, 500 to the output housing 61.

Figure 17:
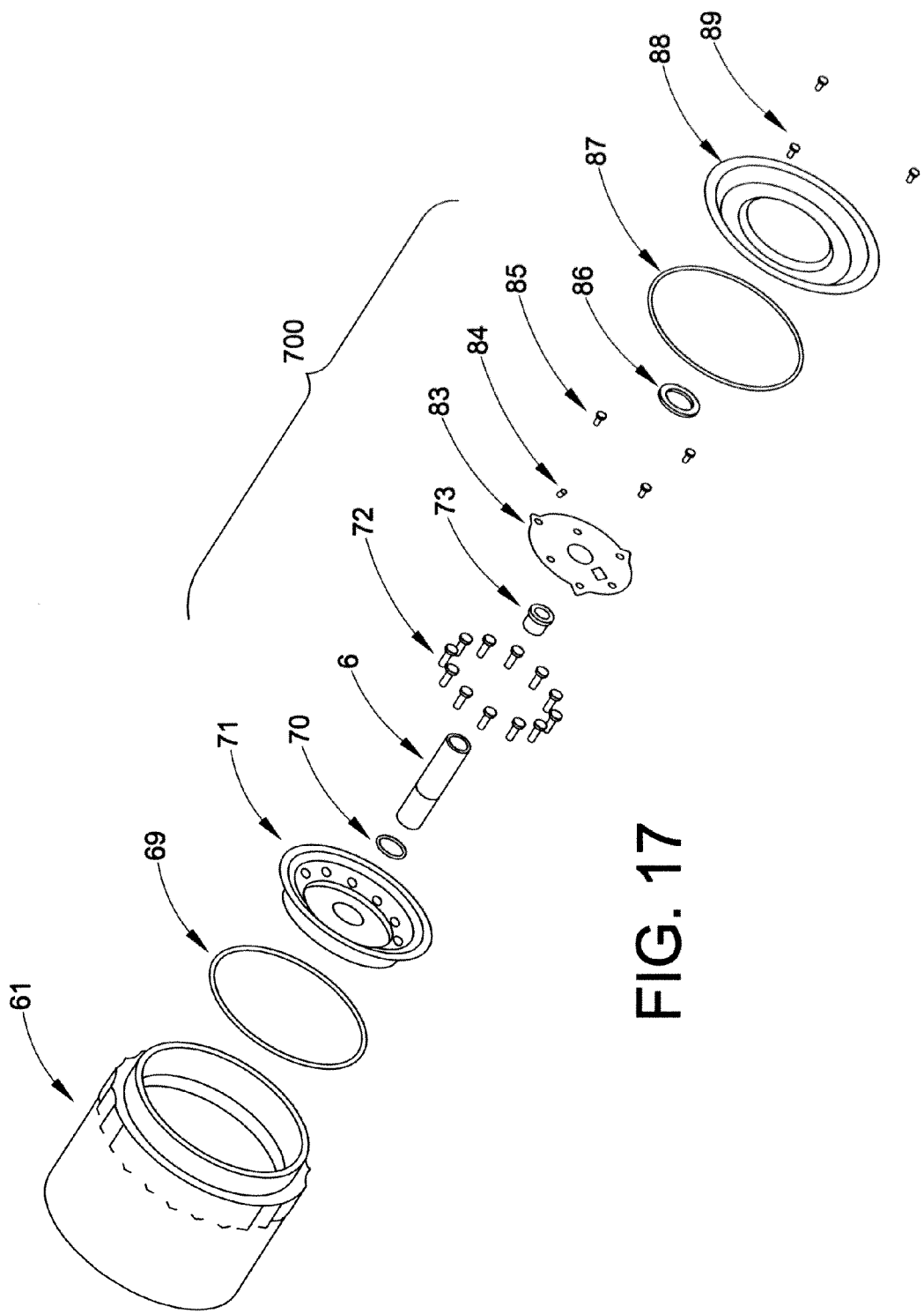
FIG. 17 is an exploded view of a rear portion of the modular rotational electric actuator of FIG. 2, illustrating a position sensor board assembly.

Now with reference to FIG. 17, an exploded view of the internal drive components 900 contained in the rear portion 201b of the actuator 201 in this embodiment are shown. In particular, those components which are located within the second electrical compartment 700 (FIGS. 7-8) are also illustrated. The components include a position sensor board 83 which may include one or more position sensors for determining the rotational or angular position of the joint with respect to the housing 61. Furthermore, the position sensor board 83 can work in combination with a disc magnet 84 for determining a location and/or limit positions of the joint. In addition, the position sensor board 83 can be secured to the pin support member 71 using fasteners 85. Lastly, a joint angle magnet 86 can also be used in conjunction with the position sensor board 83 for once again determining an angular position of the joint.

Figure 18:
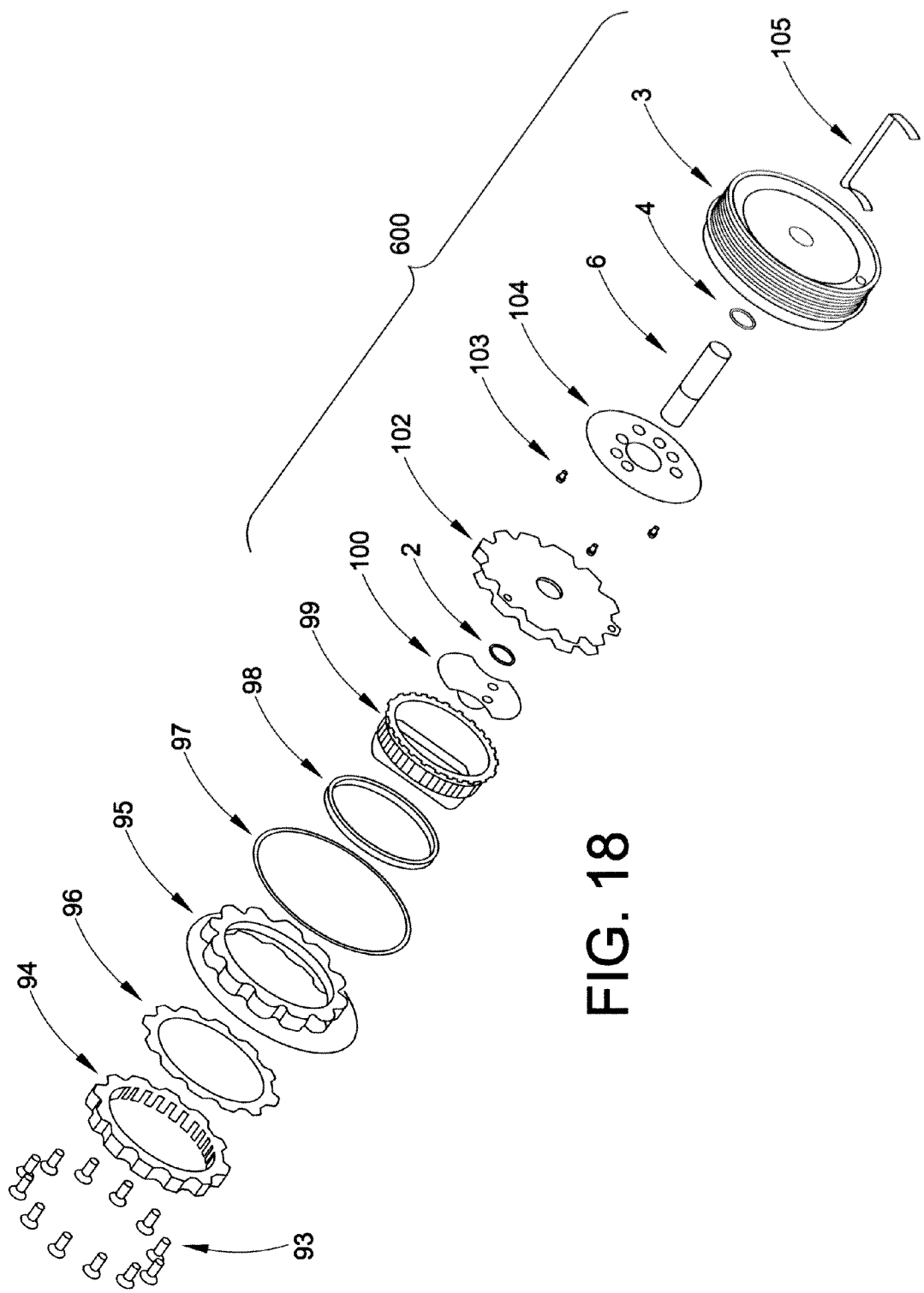
FIG. 18 is an exploded view of a forward portion of the modular rotational electric actuator of FIG. 2, illustrating a joint connector assembly, a joint torque sensor board, a motor controller board.

Now with reference to FIG. 18, the internal drive components 900 are illustrated that are generally located in the forward portion of the actuator 201. As described previously, the joint connector 99 can be coupled to the retaining member 95 via a spring or torsion resilient member 94. The resilient member 94 can be made from any elastic and resilient material which provides the proper combination of damping and/or stiffness necessary to absorb impact loads that the drive is designed to accommodate in addition to allowing for slight relative movement between the joint connector 99 and the remaining portion of the modular rotational electric actuator 201. The resilient member 94 may also improve positional control of the actuator 201 while preventing damage to the actuator 201 due to over torque. The retaining member 95 is connected to the motor side housing 3 via fasteners 93. In addition, a plain bearing 98 allows for relative movement of the joint connector 99 with respect to the retaining member 95 and an O-ring 97 provides a seal between the motor side housing 3 and the retaining member 95. Furthermore, in this embodiment, a number of electrical components are also provided in the forward region of the modular rotational electric actuator 201 within the first electrical compartment 600 (FIGS. 7-8). These include the connection board and strain gage assembly 100, a motor controller board 102, and a rotor position board 104. The motor controller board 102 may control the motor 27 by commands received from an external controller (not shown) in conjunction with information provided by the array of sensors (torque, position, speed, temperature, etc.) integrated in the actuator 201. Accordingly, it will be appreciated that the integrated motor controller board 102 negates the necessity of utilizing bulky wiring harnesses to an external motor controller. The rotor position board 104 may be provided for measuring the rotor's absolute position. Lastly, the modular rotational electric actuator 201 may use through-joint wiring, illustrated in FIGS. 7-8 as a communication, power, and/or sensor cable 105 passing through the shaft 6 and be used to establish electrical continuity between the first electrical compartment 600 and the second electrical compartment 700 (FIGS. 7-8). According to one embodiment, the shaft 6 may be hollow through the center of the actuator 201, through which the through-joint wiring, i.e., cable 105, may pass. The cable 105 may further be configured to communicatively couple the male joint connector portion to the female joint connector portion of the joint connector 99. Such a cable may also be provided for comparing signals from the position sensing boards 104 in the first electrical compartment 600 with the position sensing boards 83 of the second electrical compartment 700.

The rotor position board 104 may be placed in the first electrical compartment 600 and can be used to measure the rotor position for proper electrical commutation and to indirectly measure the output position of the actuator or drive. Similarly, a second position sensor board or joint position sensor board 83 may be located in the second electrical compartment 700 for directly measuring the absolute position of the actuator or drive (e.g., upon initial startup and/or during actuator operation). It will be appreciated that sensor board 83 may be used for positional control of the actuator 201 by sensing an initial position of the actuator 201 so as to provide the absolute position of the actuator 201. The joint position sensor 83 can also serve as a failsafe to the rotor position board 104 and prevent over travel (e.g., total angular range may be 0 to 250 degrees) of the modular rotational electric actuator 201 through the use of limit switches and/or other sensors. After startup or initialization of the modular rotational electric actuator 201, the rotor position board 104 (in conjunction with the ring of magnets 50 (FIG. 13)) may be used to continually measure the position and speed of the motor 27. It should also be noted that in an alternate embodiment, a single absolute position sensor could be used as opposed to having separate rotor position and joint position sensors 104, 83. By way of example only, the position sensor(s) 104, 83 could use a potentiometer, Hall effect sensor, or the like for measuring position.

Figure 19:
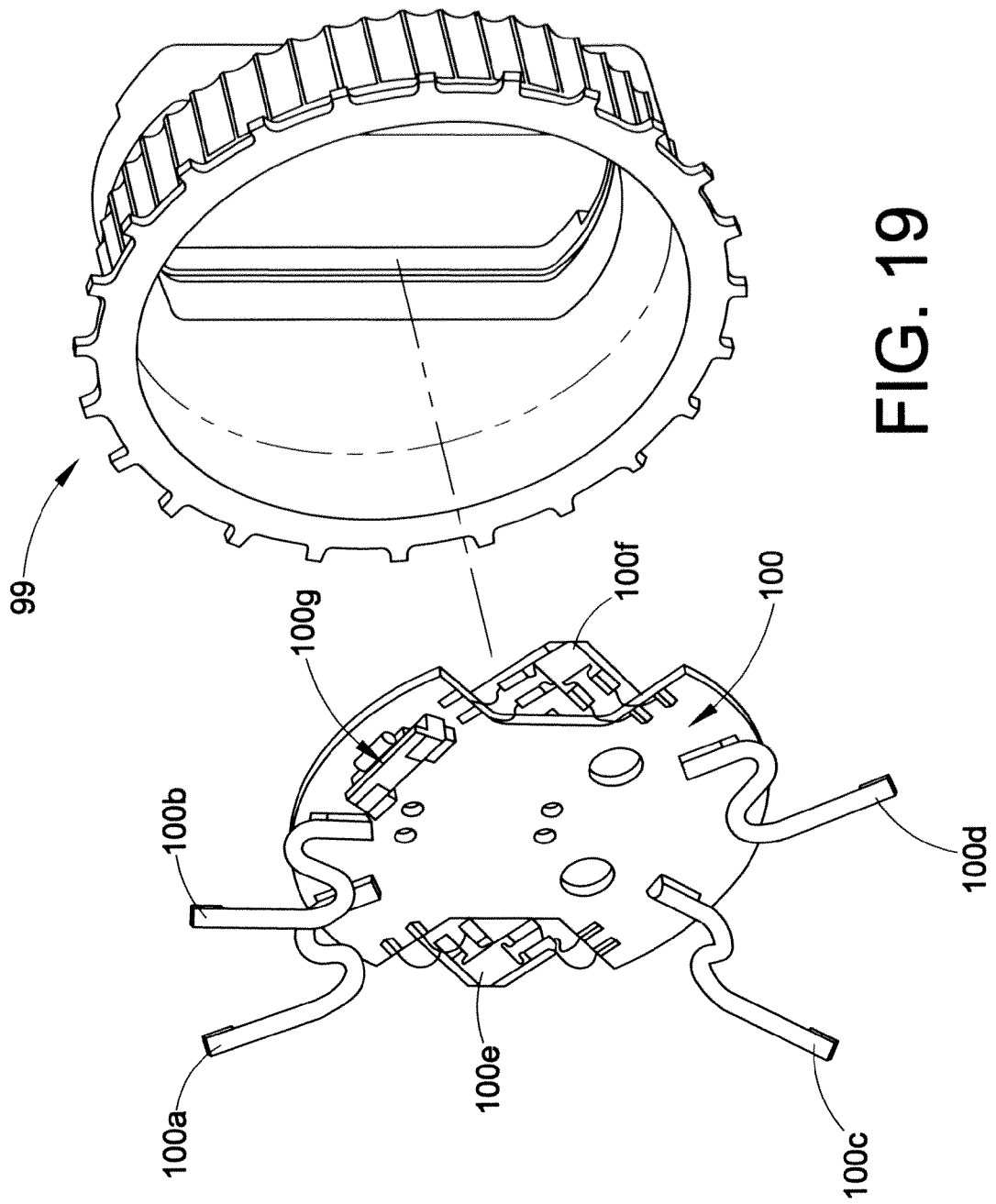
FIG. 19 is a detail exploded view of the forward portion of the modular rotational electric actuator of FIG. 18, illustrating the joint connector assembly in addition to the joint torque sensor board.

Now with respect to FIG. 19, a detailed view of the male portion of the joint connector 99 and the torque sensing strain gage board 100 are shown. In particular, the strain gage board 100 includes a plurality of wire connections 100a-100d, in addition to a pair of strain gages 100e and 100f which may communicate to other portions of the joint drive and/or off board components via a cable connection 100g. As discussed previously, a strain gage and/or a strain gage signal conditioning circuit may be used to sense the transmitted torque load across the actuator 201, segment 24, 25, and/or limb joint 20-23, 26. The strain gage can be board-mounted to the back of the joint connector 99 or in any other suitable location within the modular rotational electric actuator 201. It will be appreciated that the torque measurement may be used to facilitate accurate and safe control and operation of the limb joint 20-23, 26, as well as provide feedback of operation of the limb joint 20-23, 26 within predefined parameters. One or more electrical connectors can also be used for maintaining electrical communication to a conditioning circuit board strain gages 100e, 100f, and/or other electronics throughout the various components of the limb, joint assembly, or individual male/female joint connectors (see e.g., 801a-801b of FIGS. 22A-22B). It should be noted that the strain gages 100e, 100f could include a full, half, or quarter strain gage bridge.

While the use of strain gages 100e-100f is illustrated in the instant disclosure, other torque or load sensing devices can be used such as load cells, piezoelectric sensors, or pressure/strain sensing semiconductors, etc. In addition, position sensors could be used to measure the relative rotational displacement of the elastic element in the joint which can then be used to calculate the associated torque and/or load values. Such torque or load sensing capability is advantageous for a number of reasons. For one, it allows for a modular limb controller to properly limit the stresses that the joint and limb are subject to thereby preventing damage to the joint and/or limb 20-26. In addition, such load and/or torque information can be used by the controller to more accurately control limb motion, position, and/or to provide bio-feedback control, sensation, etc. for prosthetic limb users. An additional advantage is that torque or load sensing allows precise control of forces being exerted by the prosthetic limb on external objects (or people), thus preventing damage or injury to those objects or people. Furthermore, precise force control further enhances the stability of the system and/or limb as well as the stability of the objects being manipulated. Moreover, torque and/or load sensing is also advantageous for controlling the impedance of each joint 20-23, 26 for the same reasons that force or torque control is.

In addition, angular offset of the joint connector 99 to the rest of the joint or limb 20-26 (due to compliance of the torsion member or elastic element 94) can be calculated using two absolute sensors. A first sensor can measure the position of the motor rotor (which can be used to measure the drivetrain output position when the gear ratio is known) and a second sensor can be used to measure the displacement of the entire joint/modular actuator 201. By comparing these two position measurements, the displacement of the elastic element or resilient member 94 can be ascertained. Of course, a direct strain measurement can also be used to calculate the torque through the joint 20-23, 26 as this measurement includes less noise than the relative position sensing technique discussed above. It should further be noted that temperature compensation for change in stiffness of the elastic element/resilient member 94 would be necessary in using the relative displacement technique whereas the strain gage measurement technique does not.

Figure 20:
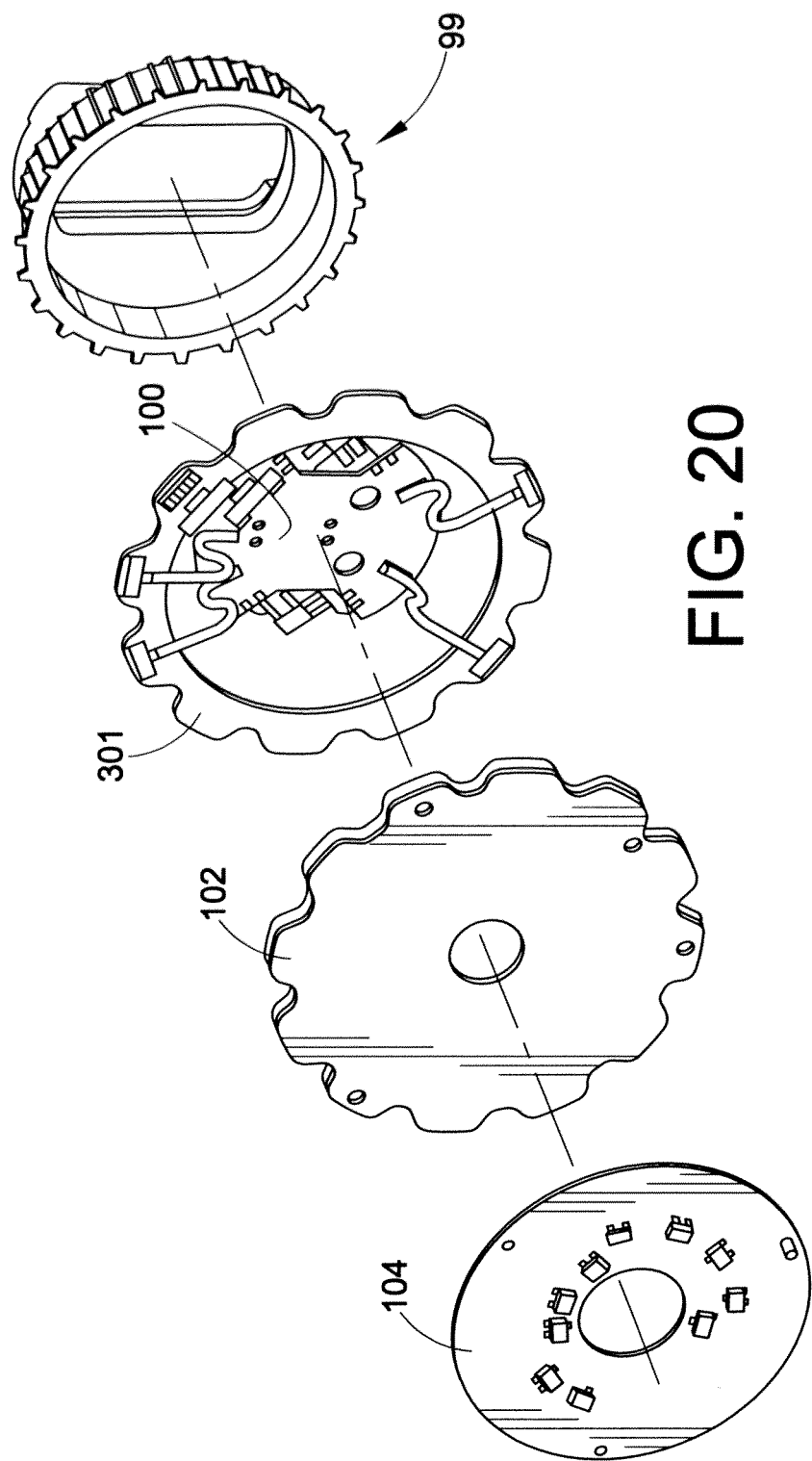
FIG. 20 is a detail exploded rear perspective view of the forward portion of the modular rotational electric actuator of FIG. 18, illustrating the joint connector assembly, the joint torque sensor board, the motor controller board and the rotor position sensing board.
Figure 21:
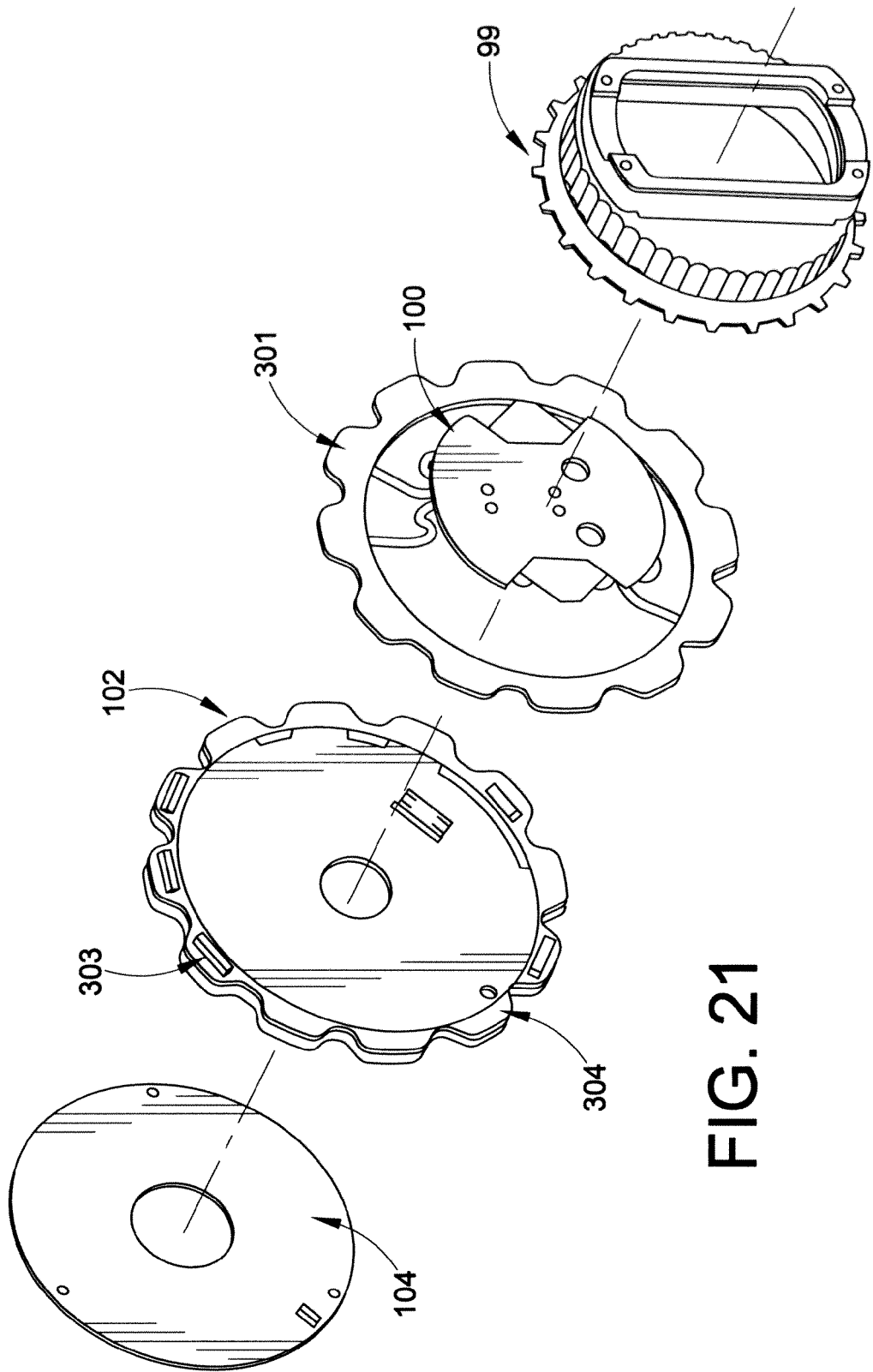
FIG. 21 is a detail exploded view of the forward portion of the modular rotational electric actuator of FIG. 18, similar to FIG. 20, but from a forward perspective view.
Figure 22A:
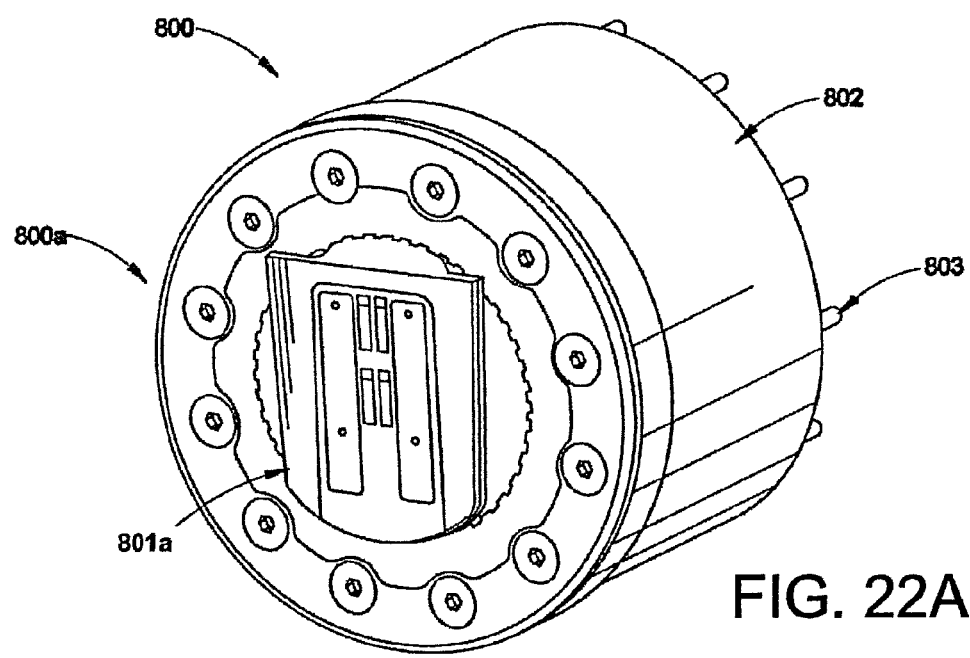
FIG. 22A is a front perspective view of a second embodiment of a modular rotational electric actuator with a male joint connector portion, according to the present disclosure.
Figure 22B:
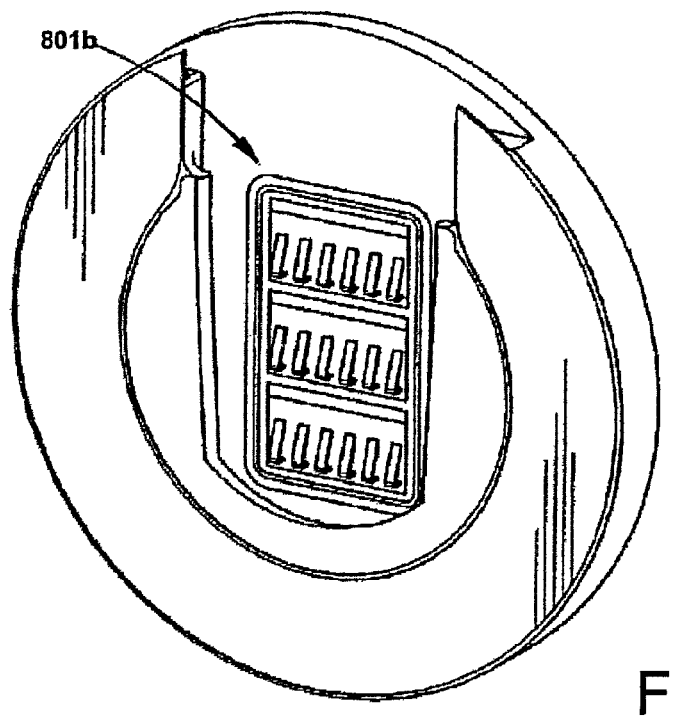
FIG. 22B is a front perspective view of a second embodiment of a modular rotational electric actuator with a female joint connector portion, according to the present disclosure

With regard to FIG. 20, the torque sensing or strain gage board assembly 100 is illustrated in its installed configuration on the joint contact board 301 in relation to the motor controller board 102 and the rotor position board 104. Similarly, with reference to FIG. 21, the joint connector 99 is shown from a forward perspective view in an exploded fashion, again illustrating the placement of the strain gage board 100, the joint contact board 301, motor controller board 102 and the rotor position board 104. Moreover, a series of joint contacts 303 are illustrated in addition to supports 304. The joint contacts 303 (or an associated joint contact board) may be used to transfer signals from the motor controller board 102 to the strain gage board 100 using spring pins or "Zebra Strip" contacts 303 to transfer power and data, and the wires between 301 and strain gage board assembly 100 (which also transfer power and data) allow a small amount of relative rotation due to flexing of the elastic element 94. The rotor position board 104 may include Hall effect sensors that measure the position of the rotor 8 using the magnets 50 mounted in hub 51. The rotor position board 104 may also include a larger central opening to clear a bearing assembly that it must fit over. Furthermore, the rotor position board 104 may be fixed with respect to the motor controller board 102. In addition, the rotor position board 104 and the motor controller board 102 may be fixed to housing 3 and be clamped in place when retaining member 95 is attached using screws 93, by way of example.

Figure 23:
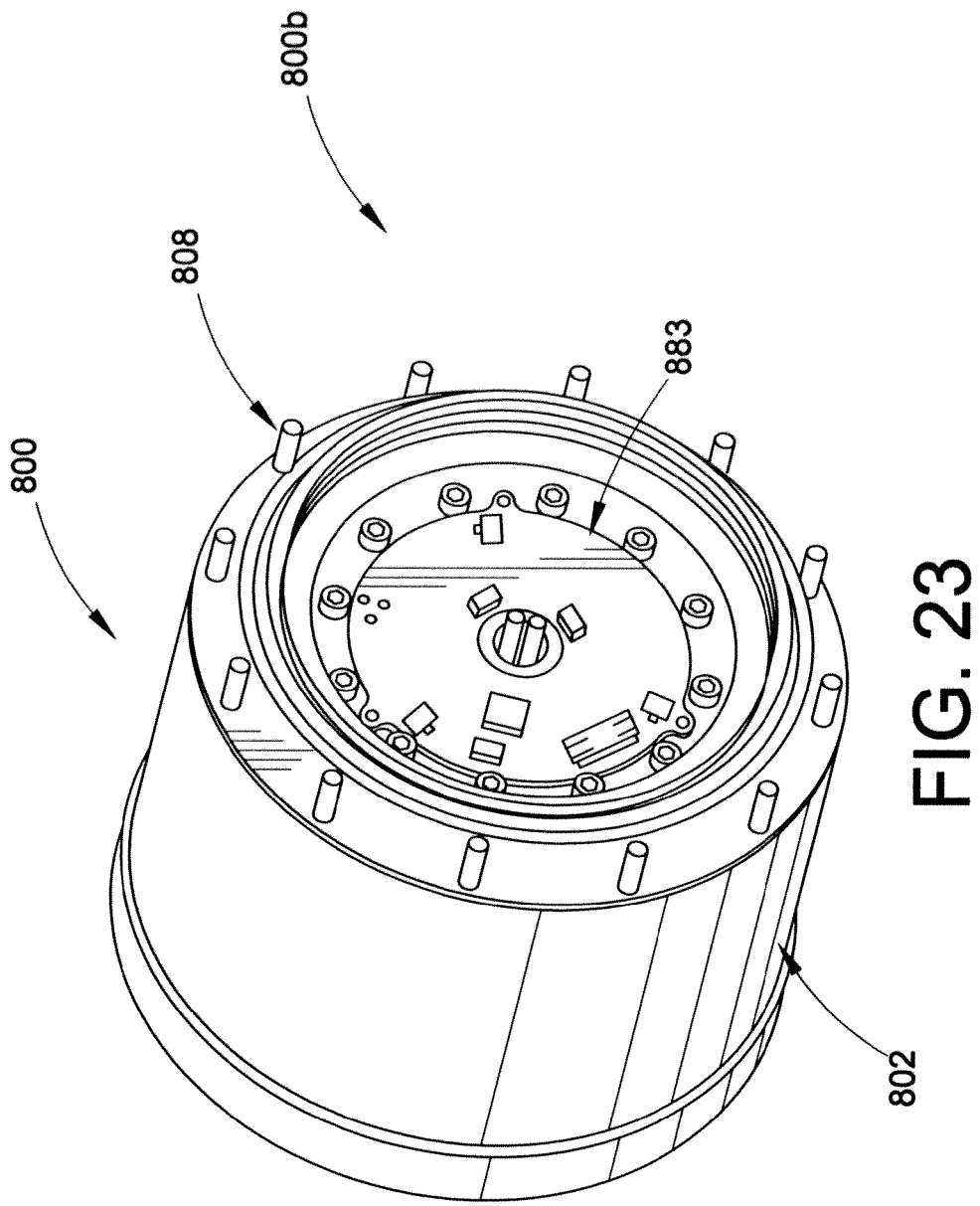
FIG. 23 is a rear perspective view of the modular rotational electric actuator of FIGS. 22A-B, illustrating a series of dowel pins extending axially from the housing and a position sensor board.

Finally with reference to FIGS. 22-26, a second embodiment of a modular rotational electric actuator 800 according to the instant disclosure is there shown. The internal drive components 900 of the second embodiment or axial modular rotational electric actuator 800 are substantially similar to those of the first embodiment i.e., actuator 201. The primary difference between the first and second embodiments involves an external housing 802 and/or a joint connector or blade 801a. The joint connector or blade 801a can be positioned at a forward end or portion 800a of the modular rotational electric actuator 800. In this respect, the axial modular rotational electric actuator 800 is better suited to drive components along an axial direction, as opposed to a radial direction. For example, and as illustrated in FIGS. 22-26, the external housing 802 includes a series of axially extending dowels or pins 803, rather than the protruding feature or keys 61a (FIGS. 2-3) of the first embodiment. With reference to FIG. 23, a joint position board 883 is illustrated at a rearmost portion 800b of the modular rotational electric actuator 800. As opposed to the actuator 201 illustrated in FIGS. 2-3 wherein the cover 88 can be used to conceal the joint position board 883, the axial actuator 800 does not require a cover since the end or rearmost portion 800b and dowels 803 are designed to interface and seal against a housing of another limb or joint segment (20-26). With regard to FIG. 24, the forward portion of the modular rotational electric actuator 800a includes the male joint connector 801a which, as with the first embodiment of the modular rotational electric actuator 201, is coupled to the internal drive components via a retainer 895, a spring or torque resilient member 894, and a plurality of fasteners 893.

It should also be noted that the male joint connector 801*a* is intended to be received into a female side connector 801*b* of the joint, limb segment, or implement. A known locking member or clip assembly (not pictured) can also be used to secure the male 801*a* and female 801*b* sides of the connector to form a resilient yet selectively releasable modular joint connection. Moreover, the modular joint connection may include multiple weather-sealed electrical connections, and integral torque sensing (as discussed previously). Electrical contact or communication through the joint connection can be achieved via one or more flat contacts 805, 806 in the male joint connector 801*a* which engage suitable elements in the female joint connector 801*b*. Larger contacts 805 can be provided for powering and grounding the motor 27 and electronics 600, 700 within the modular rotational electric actuator 201 itself as well as other joints, limb segments, and/or actuators that may be connected together in a series like fashion. Smaller contacts 806 may be used for providing serial communication, position, speed, load, and/or torque feedback information, etc. Further still, electrical slip ring connections could be used in one or more of the aforementioned connections so as to provide uninterrupted and continuous rotational motion of the modular rotational electric actuator 201 without the need for electrical or mechanical limits.

In addition, knurling can be formed on the hub of the joint connector 99 which increases the contact area with the toothed outer periphery of the material of the torsion member 94. This helps improve the mechanical bond and prevent or retard the torsion member 94 from slipping. It should be noted the resilient member 94 can be a torsional spring manufactured from any known material (plastic, rubber, metal, etc.) having the appropriate spring characteristics for the particular parameters (maximum load, stiffness, etc.) which the joint connector 99 and/or drive is designed to accommodate.

The modular rotational electric actuator and/or joint assembly disclosed herein can be used to connect multiple modules 20-23, 26 or segments 24, 25 of an associated modular limb in series, as illustrated in FIG. 1. It provides a high strength mechanical connection capable of bearing high torque and axial/radial loads, as well as an integral electrical connection for power and signals. It also includes integral torque sensing elements. Further, it provides a resilient member 94, e.g., an elastic element, compliance element, or torsion member, which enables some resiliency in the joint 20-23, 26. It should be noted that the torsion member may also serve as a series elastic element within the joint assembly which is effectively in series between the "input" or driving end of the joint and the "output" or driven end of the joint. Such a series elastic element may act as low pass filter effectively filtering out shock loads while providing enhanced force control and stability (particularly when coupled with load or torque sensors as described previously). A more detailed discussion of the advantages of using a series elastic element can be found in U.S. Pat. No. 5,650,704 to Pratt, et al., the entire disclosure of which is incorporated herein by reference.

Typical artificial limbs, such as prosthetic arms or robot arms, are designed as a single integrated assembly which cannot be simply and quickly disassembled into component modules. Moreover, such arms are not designed with load and/or torque sensing elements which are integral to the connector, since they do not even have a modular connector. Due to the lack of easily connectible limb joints, modular actuators, and/or segments, typical man-made arms do not have a single assembly which combines the mechanical and electrical interface with a load and/or torque sensor, as well as a compliance element, as in the disclosed embodiments.

Disclosed has been a lightweight compact actuator design which produces torque comparable to human strength which, when configured into a prosthetic limb, such as an arm, is comparable in terms of mass and size. The higher efficiency design disclosed herein requires less power and, therefore, smaller electrical sources, such as batteries. The design disclosed may incorporate an integrated torque sensor, an integrated absolute position sensor and integrated closed loop position software. According to one embodiment, the modular rotational electric actuator 201 disclosed herein provides a high torque to mass ratio for its weight, size and power consumption. The accurate angular position capability of the disclosed actuator results in high precision or position capability. This can be accomplished at high speed and with low noise. One of the features of the disclosed design is the tight integration of the motors, gears, electronics and controls into a very compact design. The compactness of the design is the result of employing small high precision mechanical and electronic components.

In addition, the disclosed modular rotational electric actuator 201 may employ friction gears instead of toothed gears and use two gear stages coupled using a dual surface cam. An oil bath may be provided to lubricate one or both gear systems and to dissipate heat at the same time. However, it should be noted that the disclosed modular rotational electric actuator 201 could use a variety of different gear train techniques (e.g., single or multiple stage planetary or cycloidal gear train, etc.) or no gear train at all as would be the case of a high torque low rpm rotation power source (e.g., stepper, AC/DC servo, etc.). A compact powerful brushless DC motor may also be employed to generate a high torque in a compact design. Moreover the electronic controls are illustrated herein as integrated into the actuator itself for compactness of the design. It will be appreciated that the embodiments disclosed herein may provide an advantage over previous robotic limbs as a result of the integration of the control electronics within the actuator and the elimination of bulky external electrical controllers, sensors, etc. In addition, high strength, low weight aluminum alloys may be employed, such as aluminum and steel in order to maximize miniaturization.

The disclosed modular rotational electric actuator may use DC power to run a brushless DC motor. The torque from the motor may run first through a planetary gear stage and then through a cyctoidal gear stage. A dual surfaced cam may link the two gear stages together. In such an embodiment, the output from the second gear stage is the torque output of the actuator motor. Several sensors can be employed in order to measure the position, speed and torque of the output. In addition, temperature, position and phase current of the motor are also measured. The information from one or more of these sensors may be continuously delivered to the motor control board positioned inside the actuator in order to properly control the actuator as desired by the user within its optimal operating range.

A new and improved artificial limb, such as an arm, has been disclosed which includes modular segments, joints, and/or actuators. With the modular robotic limb and actuator disclosed herein, the size, weight, and torque capability of an artificial or robotic limb can be improved. In addition, the reliability and safety of the modular joint electrical connection can also be improved. Furthermore, integral torque, position, and/or load sensors can be provided along with a compliance or torsion element to allow the joint between two segments of a limb to function better.

The disclosure has been described with reference to several embodiments. Obviously, alterations and modifications will occur to others upon a reading and understanding of this specification. It is intended to include all such modifications and alterations insofar as they come within the scope of the appended claims or the equivalents thereof.

What is claimed is:

1. A modular rotational electric actuator, comprising:
    an output housing including a front housing portion and a rear housing portion;
    the output housing including:
        internal drive components operatively located within the output housing, said internal drive components comprising: (i) a motor comprising a stator connected to a motor side housing and a rotor that rotates relative to the stator when the stator is energized; (ii) a first stage gear train assembly operatively coupled to said rotor; and, (ii) a second stage gear train assembly operatively coupled to said first stage gear train assembly to receive torque from said first stage gear train assembly and to output torque to said rear housing portion to rotate said rear housing portion relative to said front housing portion; and
        control electronics integrated within the output housing and in communication with the internal drive components, the control electronics including at least one sensor operatively coupled to at least one of the internal drive components, the at least one sensor operative to provide at least one signal or value to the control electronics indicative of a position, a torque, a load, or a speed associated with the actuator;
    a joint connector operatively coupled to the motor side housing and externally located on the front housing portion, wherein said joint connector is operatively coupled to said motor side housing through a resilient elastic member that allows for limited relative movement between the joint connector and the motor side housing to absorb impact loads;
    the rear housing portion comprising at least one structure adapted to mate with and positively engage an associated component to be rotationally driven by the rear housing portion when the rear housing portion rotates relative to said front housing portion;
    said first stage gear train assembly comprising a planetary gear assembly operatively coupled to said rotor and comprising a ring gear, a sun gear, and a plurality of planet gears supported by a planet carrier, wherein said rotor provides input torque to said planetary gear assembly and said carrier provides a torque output from said planetary gear assembly to said second stage gear train assembly;
    said second stage gear train comprising a cycloidal gear assembly comprising: (i) a cam operatively coupled to receive torque from said planet carrier of said first stage gear train assembly; (ii) a cycloidal ring gear comprising internal teeth, said cycloidal ring gear coupled to the rear housing portion to output torque to the rear housing portion; and (iii) a cycloidal wobble gear comprising external teeth engaged with the internal teeth of the cycloidal ring gear and driven by the cam such that rotation of said cam imparts an eccentric wobble motion to said cycloidal wobble gear within said cycloidal ring gear and said cycloidal wobble gear drives said cycloidal ring gear and said rear housing portion with reduced speed and increased torque relative to said planet carrier.

2. The modular rotational electric actuator of claim 1, wherein the joint connector comprises at least one of: (i) a male connector portion including a protruding, load bearing blade; (ii) a female connector portion including a socket.

3. The modular rotational electric actuator of claim 2, wherein the at least one sensor comprises a strain gage torque sensor connected to said joint connector and configured to determine torque transmitted between the joint connector and the rear housing portion.

4. The modular rotational electric actuator of claim 1, further comprising:
    a first electrical compartment located adjacent said joint connector of said front housing portion and containing a first part of said control electronics;
    a second electrical compartment spaced from said first electrical compartment adjacent said rear housing portion and containing a second part of said control electronics;
    a hollow shaft that extends between said first electrical compartment and said second electrical compartment;
    through-joint wiring that extends through said hollow shaft to operatively connect the first part of the control electronics located in said first electrical compartment to the second part of the control electronics located in said second electrical compartment.

5. The modular rotational electric actuator of claim 4, wherein said rotor is rotatably supported on said hollow shaft by a rotor bearing.

6. The modular rotational electric actuator of claim 4, wherein said at least one sensor comprises an absolute position sensor configured to directly sense an absolute position of the actuator.

7. The modular rotational electric actuator of claim 6, wherein said at least one sensor further comprises a continuous position sensor, the continuous position sensor including:
    a series of magnets circumferentially disposed around the rotor of the motor about an axis of rotation of the rotor;
    a first stationary Hall-effect sensor;
    a second stationary Hall-effect sensor;
    the first and second stationary hall-effect sensors positioned at least ninety degrees apart and configured to measure at least one of position and speed associated with an operation of the modular rotational electric actuator by sensing movement of the series of magnets relative to the first and second Hall-effect sensors when the rotor rotates.

8. The modular rotational electric actuator of claim 7, wherein said at least one sensor further comprises a temperature sensor configured to sense a temperature of the motor and the resilient elastic member.

9. The modular rotational electric actuator of claim 8, wherein the integrated control electronics further comprises an integrated motor controller, the motor controller configured to operate the motor in accordance with an external command and an output of at least one of the temperature sensor, the position sensor, the torque sensor, or the continuous position sensor.

10. The modular rotational electric actuator of claim 9, wherein the motor controller receives absolute position data from said absolute position sensor and receives rotor position data from said first and second Hall-effect sensors, and wherein said motor controller compares the absolute position data with the rotor position data to determine displacement of said resilient elastic member.

11. The modular rotational electric actuator of claim 9, wherein the motor controller utilizes the arc-tangent of the signals received from the first and second Hall-effect sensors to derive an angular position of the rotor.

12. A modular rotational electric actuator, comprising:
an output housing including a front housing portion and a rear housing portion;
the output housing including:
internal drive components operatively located within the output housing, said internal drive components comprising: (i) a motor comprising a stator connected to a motor side housing and a rotor that rotates relative to the stator when the stator is energized; (ii) a first stage gear train assembly operatively coupled to said rotor; and, (ii) a second stage gear train assembly operatively coupled to said first stage gear train assembly to receive torque from said first stage gear train assembly and to output torque to said rear housing portion to rotate said rear housing portion relative to said front housing portion; and
control electronics integrated within the output housing and in communication with the internal drive components, the control electronics including at least one sensor operatively coupled to at least one of the internal drive components, the at least one sensor operative to provide at least one signal or value to the control electronics indicative of a position, a torque, a load, or a speed associated with the actuator;
a joint connector operatively coupled to the motor side housing and externally located on the front housing portion;
the rear housing portion comprising at least one structure adapted to mate with and positively engage an associated component to be rotationally driven by the rear housing portion when the rear housing portion rotates relative to said front housing portion;
said first stage gear train assembly comprising a planetary gear assembly operatively coupled to said rotor and comprising a ring gear, a sun gear, and a plurality of planet gears supported by a planet carrier, wherein said rotor provides input torque to said planetary gear assembly and said carrier provides a torque output from said planetary gear assembly to said second stage gear train assembly;
said second stage gear train comprising a cycloidal gear assembly comprising: (i) a cam operatively coupled to receive torque from said planet carrier of said first stage gear train assembly; (ii) a cycloidal ring gear comprising internal teeth, said cycloidal ring gear coupled to the rear housing portion to output torque to the rear housing portion; and (iii) a cycloidal wobble gear comprising external teeth engaged with the internal teeth of the cycloidal ring gear and driven by the cam such that rotation of said cam imparts an eccentric wobble motion to said cycloidal wobble gear within said cycloidal ring gear and said cycloidal wobble gear drives said cycloidal ring gear and said rear housing portion with reduced speed and increased torque relative to said planet carrier.

13. The modular rotational electric actuator of claim 12, wherein the joint connector comprises at least one of: (i) a male connector portion including a protruding, load bearing blade; (ii) a female connector portion including a socket.

14. The modular rotational electric actuator of claim 13, wherein the at least one sensor comprises a strain gage torque sensor connected to said joint connector and configured to determine torque transmitted between the joint connector and the rear housing portion.

15. The modular rotational electric actuator of claim 12, further comprising:
a first electrical compartment located adjacent said joint connector of said front housing portion and containing a first part of said control electronics;
a second electrical compartment spaced from said first electrical compartment adjacent said rear housing portion and containing a second part of said control electronics;
a hollow shaft that extends between said first electrical compartment and said second electrical compartment;
through-joint wiring that extends through said hollow shaft to operatively connect the first part of the control electronics located in said first electrical compartment to the second part of the control electronics located in said second electrical compartment.

16. The modular rotational electric actuator of claim 15, wherein said rotor is rotatably supported on said hollow axial shaft by a rotor bearing.

17. The modular rotational electric actuator of claim 15, wherein said at least one sensor comprises an absolute position sensor configured to directly sense an absolute position of the actuator.

18. The modular rotational electric actuator of claim 17, wherein said at least one sensor further comprises a continuous position sensor, the continuous position sensor including:
a series of magnets circumferentially disposed around a rotor of the motor assembly about an axis of rotation of the rotor;
a first stationary Hall-effect sensor;
a second stationary Hall-effect sensor;
the first and second stationary hall-effect sensors positioned at least ninety degrees apart and configured to measure at least one of position and speed associated with an operation of the modular rotational electric actuator by sensing movement of the series of magnets relative to the first and second Hall-effect sensors when the rotor rotates.

19. The modular rotational electric actuator of claim 18, wherein said at least one sensor further comprises a temperature sensor configured to sense a temperature of the motor.

20. The modular rotational electric actuator of claim 19, wherein the integrated control electronics further comprises an integrated motor controller, the motor controller configured to operate the motor in accordance with an external command and an output of at least one of the temperature sensor, the position sensor, the torque sensor, or the continuous position sensor.

21. The modular rotational electric actuator of claim 20, wherein the motor controller receives absolute position data from said absolute position sensor and receives rotor position data from said first and second Hall-effect sensors, and wherein said motor controller compares the absolute position data with the rotor position data.

22. The modular rotational electric actuator of claim 20, wherein the motor controller utilizes the arc-tangent of the signals received from the first and second Hall-effect sensors to derive an angular position of the rotor.

23. A modular rotational electric actuator, comprising:
an output housing including a front housing portion and a rear housing portion;
the output housing including:
internal drive components operatively located within the output housing, said internal drive components comprising: (i) a motor comprising a stator connected to a motor side housing and a rotor that rotates relative to the stator when the stator is energized; (ii) a first stage gear train assembly operatively coupled to said rotor; and, (ii) a second stage gear train assembly operatively coupled to said first stage gear train assembly to receive torque from said first stage gear train assembly and to output torque to said rear housing portion to rotate said rear housing portion relative to said front housing portion; and control electronics integrated within the output housing and in communication with the internal drive components, the control electronics including at least one sensor operatively coupled to at least one of the internal drive components, the at least one sensor operative to provide at least one signal or value to the control electronics indicative of a position, a torque, a load, or a speed associated with the actuator;

a joint connector operatively coupled to the motor side housing and externally located on the front housing portion;

the rear housing portion comprising at least one structure adapted to mate with and positively engage an associated component to be rotationally driven by the rear housing portion when the rear housing portion rotates relative to said front housing portion;

said first stage gear train assembly comprising a planetary gear assembly operatively coupled to said rotor and comprising a ring gear, a sun gear, and a plurality of planet gears supported by a planet carrier, wherein said rotor provides input torque to said planetary gear assembly and said carrier provides a torque output from said planetary gear assembly to said second stage gear train assembly;

said second stage gear train comprising: (i) a torque input operatively coupled to receive torque from said planet carrier of said first stage gear train assembly; and (ii) an output ring gear coupled to the rear housing portion to output torque to the rear housing portion, wherein said output ring gear and said rear housing portion are driven by said torque input of said second stage gear train with reduced speed and increased torque relative to said planet carrier;

a first electrical compartment located adjacent said joint connector of said front housing portion and containing a first part of said control electronics;

a second electrical compartment spaced from said first electrical compartment adjacent said rear housing portion and containing a second part of said control electronics;

a hollow shaft that extends between said first electrical compartment and said second electrical compartment;

through joint wiring that extends through said hollow shaft to operatively connect the first part of the control electronics located in said first electrical compartment to the second part of the control electronics located in said second electrical compartment.

* * * * *